(12) United States Patent
Frenne et al.

(10) Patent No.: US 10,411,779 B2
(45) Date of Patent: Sep. 10, 2019

(54) CHANNEL STATE FEEDBACK FOR A WIRELESS LINK HAVING PHASE RELAXED CHANNELS

(71) Applicant: Telefonaktiebolaget LM Ericsson (publ), Stockholm (SE)

(72) Inventors: Mattias Frenne, Uppsala (SE); Robert Mark Harrison, Grapevine, TX (US); George Jöngren, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 67 days.

(21) Appl. No.: 15/545,460

(22) PCT Filed: Jan. 28, 2016

(86) PCT No.: PCT/SE2016/050056
§ 371 (c)(1),
(2) Date: Jul. 21, 2017

(87) PCT Pub. No.: WO2016/122387
PCT Pub. Date: Aug. 4, 2016

(65) Prior Publication Data
US 2018/0006700 A1 Jan. 4, 2018

Related U.S. Application Data

(60) Provisional application No. 62/109,377, filed on Jan. 29, 2015.

(51) Int. Cl.
*H04B 7/0417* (2017.01)
*H04B 7/06* (2006.01)

(52) U.S. Cl.
CPC ......... *H04B 7/0626* (2013.01); *H04B 7/0417* (2013.01); *H04B 7/0658* (2013.01); *H04B 7/0673* (2013.01)

(58) Field of Classification Search
CPC .. H04B 7/0417; H04B 7/0626; H04B 7/0658; H04B 7/0673; H04B 7/0617; H04W 24/02; H04W 72/085; H04W 84/047
See application file for complete search history.

(56) References Cited

U.S. PATENT DOCUMENTS 8,472,367 B2 * 6/2013 Larsson ............. H04B 7/15557
370/315
8,494,064 B2 * 7/2013 Watanabe ............. H04W 24/02
375/260

(Continued)

FOREIGN PATENT DOCUMENTS

WO 2005064871 A1 7/2005
WO 2011123008 A1 10/2011

OTHER PUBLICATIONS

Love, David J., "Limited Feedback Unitary Precoding for Spatial Multiplexing Systems", IEEE Transactions on Information Theory, vol. 51, No. 8, Aug. 2005, 2967-2976.

(Continued)

*Primary Examiner* — Jean A Gelin
(74) *Attorney, Agent, or Firm* — Patent Portfolio Builders, PLLC

(57) ABSTRACT

According to one of the aspects, there is provided a method for providing channel state feedback related to a wireless link between a transmitter having multiple transmit antennas and a receiver having at least one receive antenna. The method comprises determining (S1) channel estimates for at least a subset of the effective channels between the transmitter and the receiver, each effective channel including a propagation channel, and signal paths in the transmitter and the receiver. The method also comprises determining (S2) frequency-independent and/or inter-antenna-independent channel state information associated with phase relaxation of at least the subset of the effective channels based on the (Continued)

channel estimates, and generating (S3) channel state feedback including at least a representation of the frequency-independent and/or inter-antenna-independent channel state information associated with the phase relaxation. The method further comprises transmitting (S4) the channel state feedback to the transmitter.

39 Claims, 17 Drawing Sheets

(56) References Cited

U.S. PATENT DOCUMENTS

2005/0047515 A1* 3/2005 Walton ................ H04B 7/0417
                                                 375/267
2012/0033571 A1* 2/2012 Shimezawa ............ H04B 7/026
                                                 370/252

OTHER PUBLICATIONS

Zou, Yaning et al., "Analysis of Channel Non-reciprocity due to Transceiver and Antenna Coupling Mismatches in TDD Precoded Multi-user MIMO-OFDM Downlink", IEEE 80th Vehicular Technology Conference (VTC Fall), Sep. 14-17, 2014, 1-7.

* cited by examiner

CHANNEL STATE FEEDBACK FOR A WIRELESS LINK HAVING PHASE RELAXED CHANNELS

TECHNICAL FIELD

The proposed technology generally relates to wireless communication and channel state feedback related to a wireless link as well as multi-antenna transmission based on such feedback. More particularly the proposed technology relates to a method and corresponding communication unit and apparatus for providing channel state feedback, and a method and corresponding communication unit and apparatus for performing and/or controlling multi-antenna transmission, as well as a corresponding wireless device, network node, computer program and computer program product.

BACKGROUND

It is well known that the use of multiple antennas at the transmitter and/or receiver may significantly boost the performance of a wireless system. Multi-antenna techniques can significantly increase the data rates and reliability of a wireless communication system. If both the transmitter and the receiver are equipped with multiple antennas, the result is a multiple-input multiple-output, MIMO, communication channel. Such systems and/or related techniques are commonly referred to as MIMO.

Multi-antenna configurations such as MIMO have the potential of both improving data rates and increasing diversity. Precoding is an example of a multi-antenna technique for improving the performance of a wireless information transferring system by transforming the information carrying transmit vector so that the vector better fits the channel conditions. This may be performed based on channel information or completely without channel information or some combination thereof. Often, precoding is implemented as performing a linear transformation on the information carrying vector prior to transmission. Such linear transformation is usually represented by a matrix. Precoding is an integral part of 3GPP Long Term Evolution, LTE, as well as of Wideband Code Division Multiple Access, WCDMA, and Worldwide Interoperability for Microwave Access, WiMax.

There are two basic types of precoding: codebook based and non-codebook based. Codebook based precoding involves the precoding matrix implementing the linear transformation being selected from a countable and typically finite set of candidate matrices. The set of candidate matrices constitutes the codebook. On the other hand, non-codebook based precoding does not involve any quantization. The precoding element may thus for example be a continuous function of the channel matrix.

Beamforming is a special case of the more general notion of precoding and involves a single information carrying symbol stream being multiplied by a channel dependent vector that adjusts the phase of the signal on each transmit antenna so that coherent addition of the transmit signals is obtained at the receiver side. This provides diversity as well as increases the Signal-to-Noise Ratio (SNR). The precoder matrix may need to be signaled, by means of feedback signaling and/or signaling of the chosen precoder element in the forward link. The feedback signaling may be viewed as a way for the receiver to provide channel information to the transmitter.

Several different approaches are known for implementing such forward link signaling. For codebook based precoding, explicit signaling of the precoder element index in the forward link is possible. The precoder may also be implicitly signaled using precoded pilots/reference symbols/reference signals, RS, that together with non-precoded reference symbols may be used at the receiver to determine the used precoder element. Another possibility is to use precoded reference symbols also for the demodulation of the data, that is, to use so-called dedicated RS or alternatively demodulation RS or UE specific RS, and absorb the precoder element into the effective channel from the perspective of the receiver.

As mentioned above, the precoder may be determined/selected with different levels of information of the propagation channel between the transmitter and the receiver. Precoder selection that does not rely on the channel state is often referred to as open-loop precoding and is particularly useful in scenarios where the channel state changes rapidly and is not possible to track with sufficient precision. In more stationary scenarios, closed-loop precoding performs significantly better, because the precoder is adaptively selected to match the state of the channel and thereby maximize the performance.

Closed-loop precoding relies on the availability of channel state information at the transmitter, which must be provided by a feedback mechanism from the receiver. Such feedback may be analogue in the form of sounding signals in the reverse link or digitally signaled over a reverse link. For example, the receiver may select or recommend a precoder (or precoders) from a precoder codebook and feed back the corresponding codebook index to the transmitter, e.g. as in Rel-8 of LTE and which is referred to as implicit feedback in some contexts. A precoder recommendation may be seen as a form of channel quantization since typically a set of channel realizations map to a certain precoding element.

Current closed loop MIMO systems where a precoding codebook is used for channel feedback are built on the assumption that there is a phase difference between two antenna elements which value is strictly the same between any two nearby antennas in a linear equally spaced antenna array. The value of the phase difference determines the beam pointing direction of the resulting beam. This is reflected in the codebook of precoding vectors in e.g. LTE, where the precoding vectors are taken from columns in Discrete Fourier Transform, DFT, matrices.

Ideally, the DFT vector model matches the principal eigenvector to the MIMO channel and maximal antenna gain can be achieved. In reality however, there will be a mismatch between the DFT based codebook and real MIMO channels because of several reasons:

The channel is not perfectly line of sight, it has an angular spread and the DFT vector is therefore not matched to the true channel, i.e. the principal eigenvector has not DFT vector structure and precoding gain is lost. The strict linear and equal phase progression relationship between adjacent antennas is thus subject to phase relaxation.

The DFT based codebook has a finite set of beam pointing directions and if a UE is positioned in between two existing beam main directions there is a loss in precoding gain.

The hardware in the transmitter does not have an identical phase for all the transmit antennas. One reason for this phase relaxation is that cable lengths and so forth from the transmitter to the actual antenna element are different for different antennas. This will defocus the main beam and have the effect that precoding gain is reduced.

The hardware in the transmitter does not have an identical time delay for all antennas. This would cause a frequency dependent beam pointing offset compared to the ideal beam pointing direction.

In TDD systems or in FDD systems using beamforming, reciprocity can be used to reduce feedback overhead. In such systems, both the receive and transmit chains typically have to be calibrated such that uplink measurements can be used to determine downlink precoding. In this case, errors in the receive chain calibration can also cause incorrect precoding matrices to be used for the downlink.

Hence, there is inefficiency in the current codebook design due to these circumstances, which is a problem that leads to reduced antenna gain and increased interference in the system.

SUMMARY

It is a general object to improve the performance of systems using multi-antenna techniques, and particularly to improve the channel state feedback and/or eliminate the precoder performance degradations caused by phase relaxation.

It is an object to provide a method for providing channel state feedback related to a wireless link.

It is also an object to provide a communication unit configured to provide channel state feedback related to a wireless link.

It is another object to provide a method of performing multi-antenna transmission based on channel state feedback.

It is also an object to provide a communication unit configured to perform multi-antenna transmission based on channel state feedback.

Another object is to provide a computer program and corresponding computer program product for generating channel state feedback related to a wireless link.

Yet another object is to provide a computer program and corresponding computer program product for controlling multi-antenna transmission based on channel state feedback.

It is also an object to provide a channel state feedback generating device.

Another object is to provide a channel state feedback extracting device.

Still another object is to provide an apparatus and corresponding wireless device for providing or generating channel state feedback related to a wireless link.

It is also an object to provide an apparatus and corresponding network node for controlling multi-antenna transmission.

It is yet another object to provide a method for compensating for phase relaxation.

These and other objects are met by at least one embodiment of the proposed technology.

According to a first aspect, there is provided a method for providing channel state feedback related to a wireless link between a transmitter having multiple transmit antennas and a receiver having at least one receive antenna. The method comprises determining channel estimates for at least a subset of the effective channels between the transmitter and the receiver, each effective channel including a propagation channel, and signal paths in the transmitter and the receiver. The method also comprises determining frequency-independent and/or inter-antenna-independent channel state information associated with phase relaxation of at least the subset of the effective channels based on the channel estimates, and generating channel state feedback including at least a representation of the frequency-independent and/or inter-antenna-independent channel state information associated with the phase relaxation. The method further comprises transmitting the channel state feedback to the wireless transmitter.

According to a second aspect, there is provided a communication unit configured to provide channel state feedback related to a wireless link between a transmitter having multiple transmit antennas and a receiver having at least one receive antenna. The communication unit is configured to determine channel estimates for at least a subset of the effective channels between the transmitter and the receiver, each effective channel including a propagation channel, and signal paths in the transmitter and the receiver. The communication unit is configured to determine frequency-independent and/or inter-antenna-independent channel state information associated with phase relaxation of at least the subset of the effective channels based on the channel estimates. The communication unit is configured to generate channel state feedback including at least a representation of the frequency-independent and/or inter-antenna-independent channel state information associated with the phase relaxation. The communication unit is configured to transmit the channel state feedback to the transmitter.

According to a third aspect, there is provided a method of performing multi-antenna transmission from a transmitter having multiple transmit antennas to a receiver having at least one receive antenna. The method comprises receiving channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver. The method also comprises determining a transmission operation at least partly based on the channel state feedback including the representation of frequency-independent and/or inter-antenna-independent channel state information associated with the phase relaxation, and performing multi-antenna transmission according to the determined transmission operation.

According to a fourth aspect, there is provided a communication unit configured to perform multi-antenna transmission from a transmitter having multiple transmit antennas to a receiver having at least one receive antenna. The communication unit is configured to receive channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver. The communication unit is configured to determine a transmission operation at least partly based on the channel state feedback including the representation of frequency-independent and/or inter-antenna-independent channel state information associated with the phase relaxation. The communication unit is configured to perform multi-antenna transmission according to the determined transmission operation.

According to a fifth aspect, there is provided a computer program for generating, when executed by at least one processor, channel state feedback related to a wireless link between a transmitter having multiple transmit antennas and a receiver having at least one receive antenna. The computer program comprises instructions, which when executed by said at least one processor, cause the at least one processor to:

determine channel estimates for at least a subset of the effective channels between the transmitter and the receiver, each effective channel including a propagation channel, and signal paths in the transmitter and the receiver;

determine frequency-independent and/or inter-antenna-independent channel state information associated with phase relaxation of at least the subset of the effective channels based on the channel estimates; and generate channel state feedback including at least a representation of the frequency-independent and/or inter-antenna-independent channel state information associated with the phase relaxation.

According to a sixth aspect, there is provided a computer program for controlling, when executed by at least one processor, multi-antenna transmission from a transmitter having multiple transmit antennas to a receiver having at least one receive antenna. The computer program comprises instructions, which when executed by said at least one processor, cause the at least one processor to:

extract channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver; and control the transmission operation at least partly based on the channel state feedback including the representation of frequency-independent and/or inter-antenna-independent channel state information associated with the phase relaxation.

According to a seventh aspect, there is provided a computer program product comprising a computer-readable medium having stored thereon a computer program according to the fifth or sixth aspect.

According to an eighth aspect, there is provided a channel state feedback generating device configured to generate channel state feedback related to a wireless link between a transmitter having multiple transmit antennas and a receiver having at least one receive antenna. The channel state feedback generating device is configured to determine frequency-independent and/or inter-antenna-independent channel state information associated with phase relaxation of at least a subset of the effective channels between the transmitter and the receiver based on channel estimates for at least the subset of the effective channels, each effective channel including a propagation channel, and signal paths in the transmitter and the receiver. The channel state feedback generating device is also configured to generate channel state feedback including at least a representation of the frequency-independent and/or inter-antenna-independent channel state information associated with the phase relaxation.

According to a ninth aspect, there is provided a channel state feedback extracting device configured to extract channel state feedback related to a wireless link between a transmitter having multiple transmit antennas and a receiver having at least one receive antenna. The channel state feedback extracting device is configured to receive feedback signaling and extract channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver.

According to a tenth aspect, there is provided an apparatus for providing channel state feedback related to a wireless link between a transmitter having multiple transmit antennas and a receiver having at least one receive antenna. The apparatus comprises a channel estimate determining module for determining channel estimates for at least a subset of the effective channels between the transmitter and the receiver, each effective channel including a propagation channel, and signal paths in the transmitter and the receiver. The apparatus also comprises a channel state information determining module for determining frequency-independent and/or inter-antenna-independent channel state information associated with phase relaxation of at least the subset of the effective channels based on the channel estimates. The apparatus further comprises a feedback generating module for generating channel state feedback including at least a representation of the frequency-independent and/or inter-antenna-independent channel state information associated with the phase relaxation.

According to an eleventh aspect, there is provided a wireless device for wireless communication, the wireless device including an apparatus according to the tenth aspect.

According to a twelfth aspect, there is provided an apparatus for controlling multi-antenna transmission from a transmitter having multiple transmit antennas to a receiver having at least one receive antenna. The apparatus comprises a channel state feedback extracting module for extracting channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver. The apparatus also comprises a transmission operation control module for controlling the transmission operation at least partly based on the channel state feedback including the representation of frequency-independent and/or inter-antenna-independent channel state information associated with the phase relaxation.

According to a thirteenth aspect, there is provided a network node for wireless communication, the network node including an apparatus according to the twelfth aspect.

According to a fourteenth aspect, there is provided a method for compensating for phase relaxation of at least a subset of the effective channels between a transmitter having multiple transmit antennas and a receiver having at least one receive antenna. The method comprises obtaining channel state feedback including at least a representation of frequency-independent and/or inter-antenna-independent channel state information associated with the phase relaxation of at least the subset of the effective channels between the transmitter and the receiver, each effective channel including a propagation channel, and signal paths in the transmitter and the receiver. The method also comprises performing compensation for the phase relaxation at least partly based on the channel state feedback including the representation of frequency-independent and/or inter-antenna-independent channel state information associated with the phase relaxation.

An advantage of the proposed technology is improved channel state feedback, which may be used, e.g. for improved transmission operation and/or improved precoding performance.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
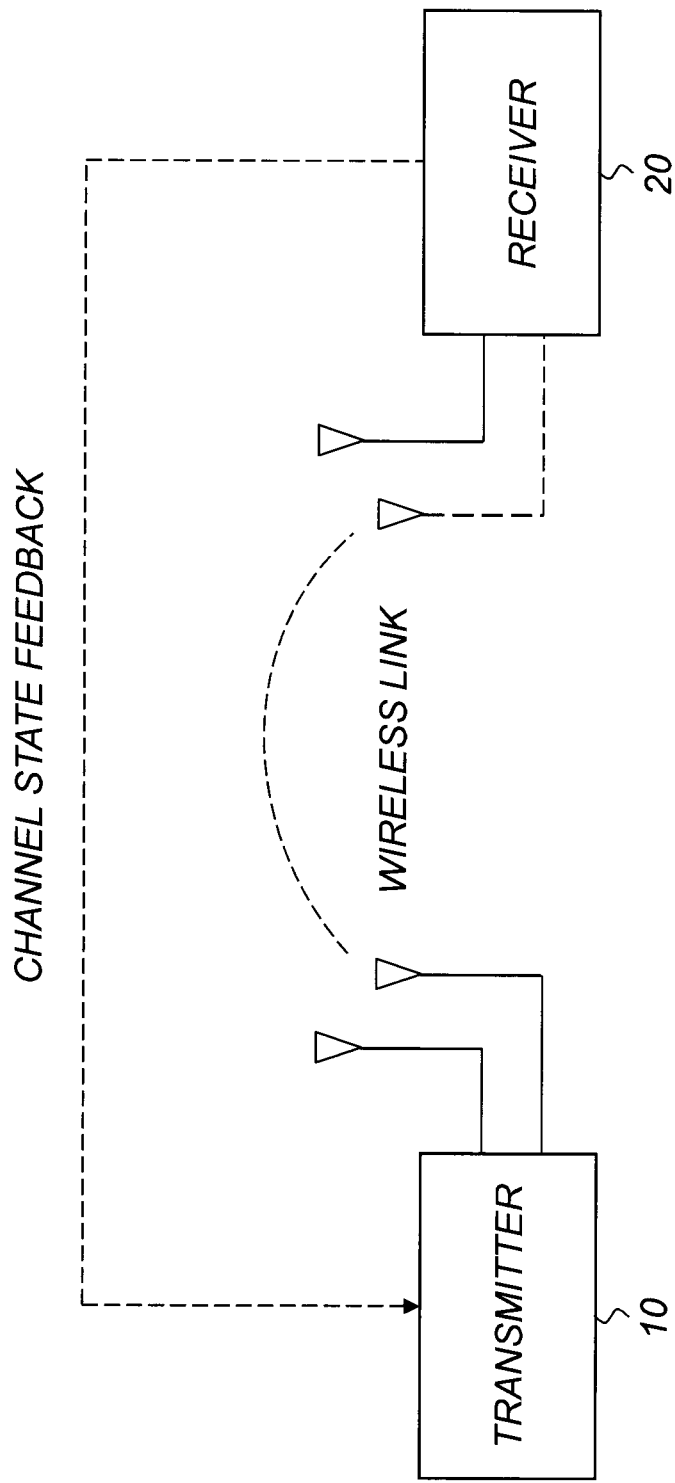
FIG. 1 is a schematic diagram illustrating an example of a transmitter connected to a receiver over a wireless link.

FIG. 1 is a schematic diagram illustrating an example of a transmitter connected to a receiver over a wireless link.

The transmitter 10 is equipped with multiple transmit antennas, i.e. at least two antennas. The receiver 20 is equipped with at least one antenna, but may also have multiple antennas. Due to the use of multiple antennas, the wireless link between the transmitter 10 and the receiver 20 can be regarded as comprised of multiple channels, each effective channel including a propagation channel and signal paths in the transmitter 10 and receiver 20, from a respective transmit antenna port to the receiver circuitry connected to a respective receive antenna.

As previously mentioned, it is desirable to improve the performance of systems using multi-antenna techniques, and particularly to improve the channel state feedback and/or eliminate the precoder performance degradations caused by phase relaxation.

For example, the inventors have recognized that for closed-loop precoding to be effective, it is important that the precoder is well matched to the state of the effective channel(s), including transmit and receive filters, channel responses of antenna cables and of course the actual propagation channel.

Figure 2:
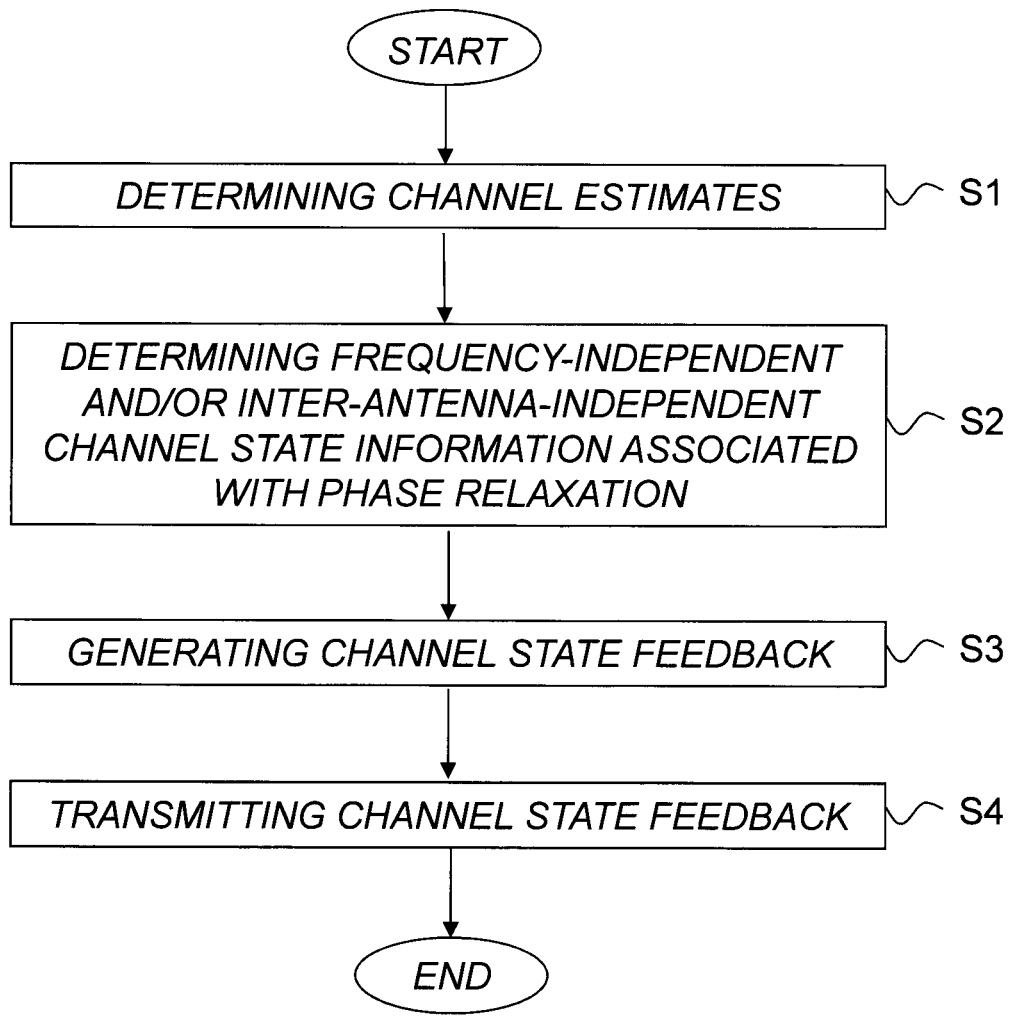
FIG. 2 is a schematic flow diagram illustrating an example of a method for providing channel state feedback related to a wireless link according to an embodiment.

FIG. 2 is a schematic flow diagram illustrating an example of a method for providing channel state feedback related to a wireless link between a transmitter having multiple transmit antennas and a receiver having at least one receive antenna according to an embodiment. The method comprises the following steps:

S1: Determining channel estimates for at least a subset of the effective channels between the transmitter and the receiver, each effective channel including a propagation channel, and signal paths in the transmitter and the receiver.

S2: Determining frequency-independent and/or inter-antenna-independent channel state information associated with phase relaxation of at least the subset of the effective channels based on the channel estimates.

S3: Generating channel state feedback including at least a representation of the frequency-independent and/or inter-antenna-independent channel state information associated with the phase relaxation.

S4: Transmitting the channel state feedback to the wireless transmitter.

In a multi-antenna scenario, each effective channel can be regarded as having a propagation channel and signal paths in the transmitter and the receiver, from a respective transmit antenna port to and including at least part of a receiver chain connected to a respective receive antenna.

For completeness it should be understood that it is possible to group physical antennas into subarrays and assign an antenna port to a corresponding subarray of one or more antennas. For simplicity, a one-to-one mapping between antennas and antenna ports will be assumed in the following, meaning that an antenna port is assigned to a respective antenna.

By way of example, the channel state feedback may be generated and transmitted as part of a precoder report including the representation of the frequency-independent and/or inter-antenna-independent channel state information associated with the phase relaxation.

In a particular set of example embodiments, the determined frequency-independent and/or inter-antenna-independent channel state information is both frequency-independent and inter-antenna-independent.

In another particular set of example embodiments, the determined frequency-independent and/or inter-antenna-independent channel state information is frequency-independent.

In yet another particular set of example embodiments, the determined frequency-independent and/or inter-antenna-independent channel state information is inter-antenna-independent.

As an example, the frequency-independent and/or inter-antenna-independent channel state information associated with the phase relaxation of at least the subset of the effective channels may be determined by determining the phase relaxation independently for each of at least a subset of the multiple transmit antennas. The representation of the inter-antenna-independent channel state information may then include a representation of the independently determined phase relaxations.

Optionally, the independently determined phase relaxations may be represented as absolute or relative phases.

For example, the independently determined phase relaxation, for each of at least a subset of the multiple transmit antennas, includes at least a static, frequency-independent phase relaxation part.

Optionally, a frequency-dependent phase relaxation part is also determined and reported as part of the channel state feedback.

In an optional embodiment, each independently determined phase relaxation relates to a static phase error associated with a corresponding or respective transmit antenna.

As will be explained later on, it is also possible to provide or determine a metric of the position at which the static phase errors were measured.

By way of example, the representation of the independently determined phase relaxations corresponds to a diagonal matrix having phase relaxation related components as elements of a main diagonal.

As will be discussed later on, the representation of the independently determined phase relaxations corresponding to the diagonal matrix $\Lambda$ may be reported with a representation of a precoder $W^{(W)}$ for providing a combined precoder structure $W = \Lambda W^{(W)}$.

By way of example, the combined precoder structure comprises at least two parts, one which is selected independently for each transmit antenna (port), and one part that is selected by jointly considering multiple transmit antennas (ports).

Examples of different ways of implementing the diagonal matrix $\Lambda$ will be described later on.

The channel state feedback may also include a representation of inter-antenna-dependent channel state information for use when determining a precoder matrix. This inter-antenna-dependent channel state information may include frequency-dependent and/or frequency-independent information.

In a particular example, the channel state feedback is in the form of Channel State Information, CSI, feedback.

The method described above may typically be performed per subcarrier, as will be exemplified later on.

The method can alternatively be regarded as a method of operating a communication unit for wireless communication.

Figure 3:
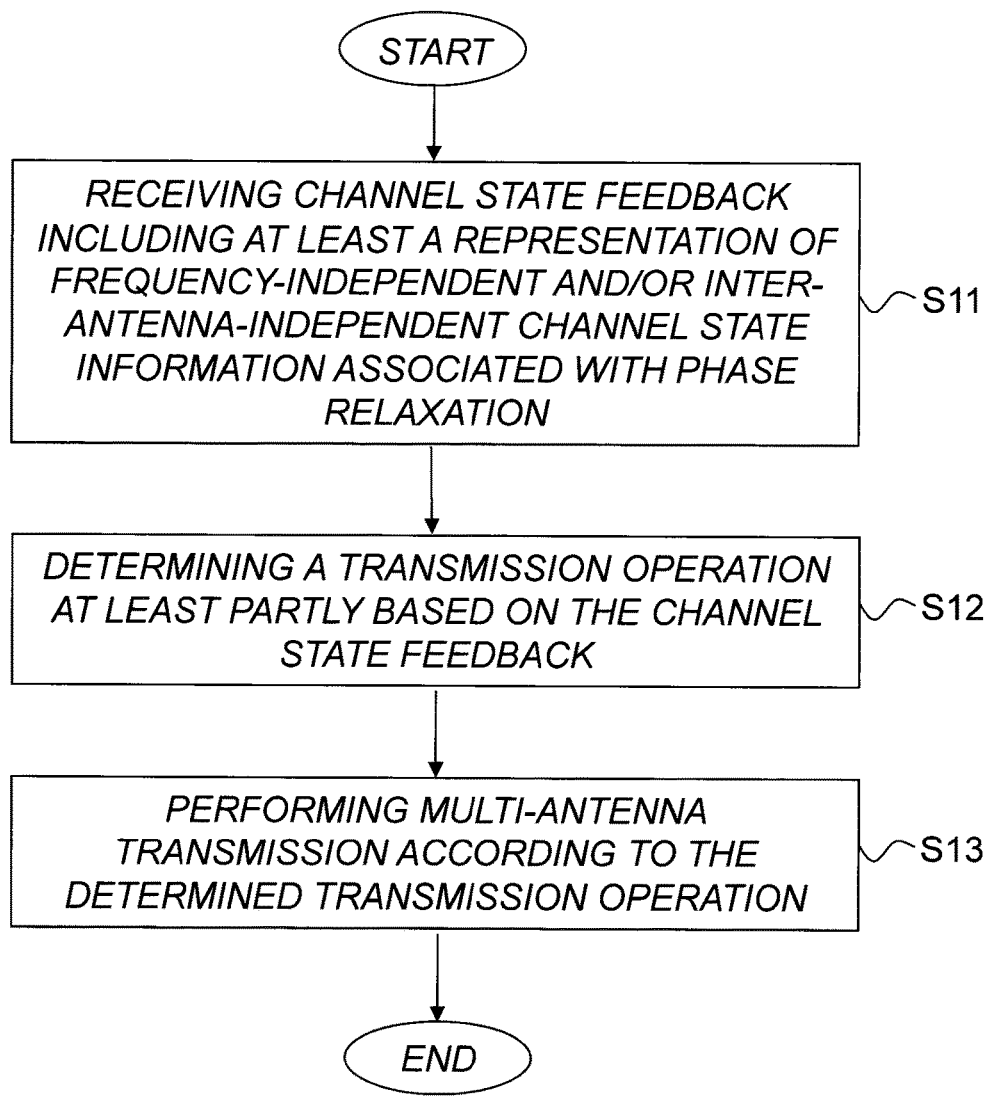
FIG. 3 is a schematic flow diagram illustrating an example of a method of performing multi-antenna transmission according to an embodiment.

FIG. 3 is a schematic flow diagram illustrating an example of a method of performing multi-antenna transmission from a transmitter having multiple transmit antennas to a receiver having at least one receive antenna according to an embodiment. The method comprises the following steps:

S11: Receiving channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver.

S12: Determining a transmission operation at least partly based on the channel state feedback including the representation of frequency-independent and/or inter-antenna-independent channel state information associated with phase relaxation.

S13: Performing multi-antenna transmission according to the determined transmission operation.

Determining a transmission operation normally means determining a way or scheme in which to perform and/or control at least part of a transmission and/or to process signals for transmission, and/or determining a manner of operating and/or controlling at least part of the transmission circuitry of a transmitter. The actual transmission, such as a multi-antenna transmission, can then be performed according to the determined transmission operation.

By way of example, the above process may involve determining a precoder as a way or scheme in which to perform and/or control at least part of a transmission and/or to process signals for transmission, and perform multi-antenna transmission according to the determined precoder.

In a multi-antenna scenario, each effective channel includes a propagation channel and signal paths in the transmitter and the receiver, from a respective transmit antenna port to and including at least part of a receiver chain connected to a respective receive antenna.

By way of example, the channel state feedback may be received as part of a precoder report including the representation of frequency-independent and/or inter-antenna-independent channel state information associated with the phase relaxation.

In a particular set of example embodiments, the frequency-independent and/or inter-antenna-independent channel state information is both frequency-independent and inter-antenna-independent.

In another particular set of example embodiments, the frequency-independent and/or inter-antenna-independent channel state information is frequency-independent.

In yet another particular set of example embodiments, the frequency-independent and/or inter-antenna-independent channel state information is inter-antenna-independent.

As an example, a precoder to be used for transmission may be determined at least partly based on the channel state feedback including the representation of frequency-independent and/or inter-antenna-independent channel state information associated with the phase relaxation, and multi-antenna transmission may then be performed according to the determined precoder.

For example, a diagonal matrix having phase relaxation related components/values as elements of a main diagonal may be generated based on the representation of frequency-independent and/or inter-antenna-independent channel state information associated with the phase relaxation, and the precoder to be used for transmission is determined or generated by combining the diagonal matrix with a (re-)ported precoding matrix.

By way of example, the received channel state feedback also includes a representation of inter-antenna-dependent channel state information for use when determining a precoder matrix. This inter-antenna-dependent channel state information may include frequency-dependent and/or frequency-independent information.

Optionally, the representation of the frequency-independent and/or inter-antenna-independent channel state information includes a representation of independent phase relaxations for at least a subset of the multiple transmit antennas, and there is a representation of an independent phase relaxation for each of at least a subset of the multiple transmit antennas.

By way of example, the independent phase relaxations may be represented as absolute or relative phases.

In a particular example, the independent phase relaxation, for each of at least a subset of the multiple transmit antennas, includes at least a static, frequency-independent phase relaxation part.

In an optional embodiment, each independent phase relaxation relates to a static phase error associated with a corresponding or respective transmit antenna.

By way of example, the transmitter, with knowledge of the static phase error $\hat{\omega}_k$, may perform phase error compensation in baseband processing by applying an opposite phase shift $-\hat{\omega}_k$ of signals transmitted from transmit antenna k.

For example, the reported precoding matrix (defining a precoder) may be augmented based on the independent phase relaxation(s). By way of example, a precoder may thus be generated based on the independent phase relaxation(s), and multi-antenna transmission may then be performed according to the determined precoder.

In a particular embodiment, the reported precoding/precoder matrix may be augmented with a diagonal matrix including independent phase relaxation(s) as elements of a main diagonal. More specifically, the precoding matrix, denoted $W^{(W)}$ may be augmented by a diagonal matrix, denoted $\Lambda$, including independent phase relaxation(s) in elements of a main diagonal for providing a combined precoder structure $W=\Lambda W^{(W)}$.

For example, the codebook augmentation $W=\Lambda W^{(W)}$ allows for compensation of static (phase) error terms and/or frequency dependent terms that occur due to time misalignments.

Optionally, a representation of a frequency-dependent phase relaxation part may also be received as part of the channel state feedback and used as input for determining the transmission operation.

Optionally, channel state feedback including at least a representation of frequency-independent and/or inter-antenna-independent channel state information may be collected from multiple receivers and jointly processed to obtain an estimate of the phase relaxation.

For example, channel state feedback from wireless communication devices (such as UEs) located at widely distributed positions throughout a cell may be used for estimating static phase errors.

In a particular example, the channel state feedback is in the form of Channel State Information, CSI, feedback.

The method described above may typically be performed per subcarrier, as will be exemplified later on.

The method can alternatively be regarded as a method of operating a communication unit for wireless communication.

For a better understanding of the proposed technology, it may be useful to continue with a brief overview and analysis of multi-antenna techniques and precoding procedures.

Note that although terminology from 3GPP LTE will sometimes be used to exemplify the proposed technology, this should not be seen as limiting the scope to only the aforementioned system. Other wireless systems, including WCDMA, WiMax, UMB and GSM, may also benefit from exploiting the proposed technology.

Also note that terminology used in the following such as eNodeB and UE should be considered non-limiting and does in particular not imply a certain hierarchical relation between the two units. In general, "eNodeB" could be considered as a communication unit or device and "UE" as another communication unit or device, and these two devices communicate with each other over some radio channel. It should also be understood that the proposed technology can be applied for wireless transmissions in the downlink as well as the uplink. The term communication unit as used herein is a general term including a physical unit on the network side such as a network node like a base station, and a wireless device such as a UE or similar user device for wireless communication.

As mentioned, multi-antenna techniques can significantly increase the data rates and reliability of a wireless communication system. The performance is in particular improved if both the transmitter and the receiver are equipped with multiple antennas, which results in a multiple-input multiple-output, MIMO, communication channel. Such systems and/or related techniques are commonly referred to as MIMO.

Figure 4:
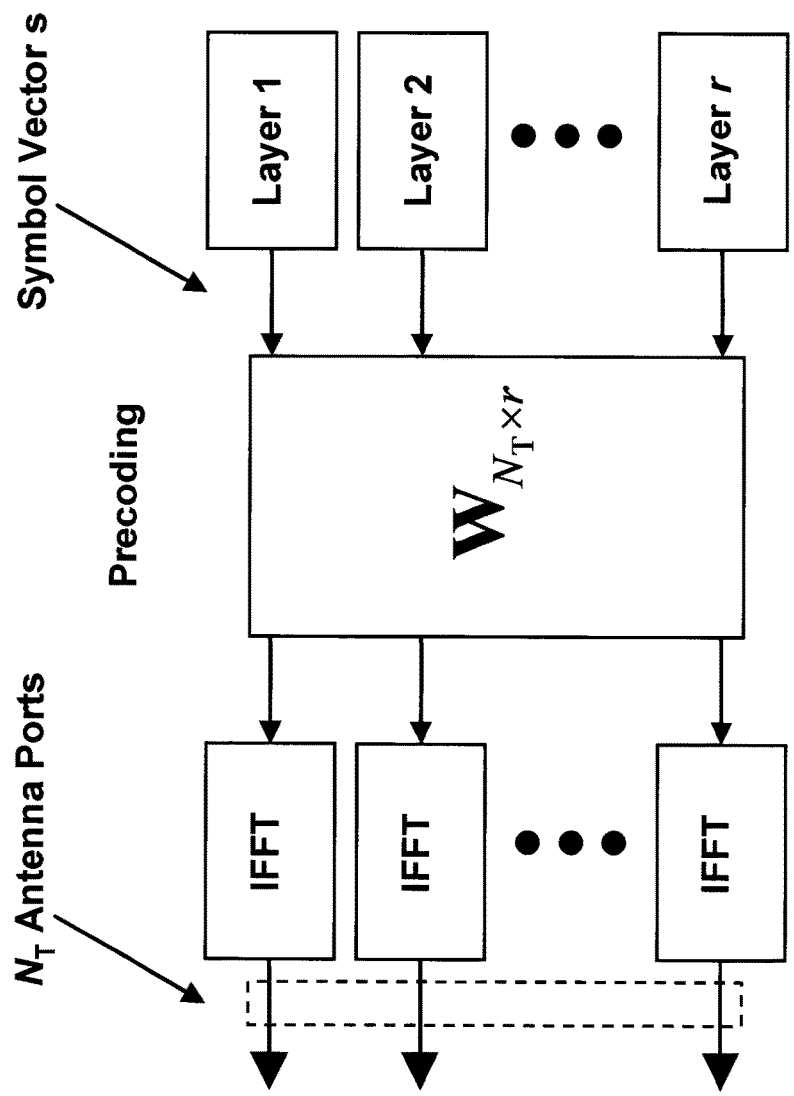
FIG. 4 is a schematic diagram illustrating an example of a transmission structure for a precoded spatial multiplexing mode of transmission.

The LTE standard is currently evolving with enhanced MIMO support. A core component in LTE is the support of MIMO antenna deployments and MIMO related techniques. A current working assumption in LTE-Advanced is the support of an 8-layer spatial multiplexing mode for 8 Tx antennas with possibly channel dependent precoding. The spatial multiplexing mode is aimed for high data rates in favorable channel conditions. An illustration of the spatial multiplexing operation is provided in FIG. 4.

As seen, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. If the precoder matrix is confined to have orthonormal columns, then the design of the codebook of precoder matrices corresponds to a Grassmanian subspace packing problem. The r symbols in s each correspond to a layer and r is referred to as the transmission rank. In this way, spatial multiplexing is achieved since multiple symbols can be transmitted simultaneously over the same time/frequency resource element, TFRE. The number of symbols r is typically adapted to suit the current channel properties.

LTE uses Orthogonal Frequency Division Multiplexing, OFDM, in the downlink (and DFT precoded OFDM in the uplink) and hence the received $N_R \times 1$ vector $y_n$ for a certain TFRE on subcarrier n (or alternatively data TFRE number n) is modeled by:

$$y_n = H_n W_{N_T \times r} s_n + e_n \quad (1)$$

where $e_n$ is a noise/interference vector obtained as realizations of a random process. The precoder, $W_{N_T \times r}$, can be a wideband precoder, which is constant over frequency, or frequency selective.

The precoder matrix is often chosen to match the characteristics of the $N_R \times N_T$ MIMO channel matrix H, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding for the LTE downlink, the UE transmits, based on channel measurements in the forward link (downlink), recommendations to the eNodeB of a suitable precoder to use. The eNodeB may choose to use the so recommended precoders or it may decide to other precoders. The reporting from the UE is constrained to a codebook, but the transmission from the eNodeB may or may not be constrained to a codebook. The former case corresponds to so-called codebook based precoding on the transmit side and is usually associated with Cell-specific Reference Signals (CRS) based data transmissions. The case when the transmissions are not constrained to a precoder codebook usually relies on demodulation reference signals (DMRS) based transmissions and is sometimes referred to as non-codebook based precoding.

A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information, CSI, feedback, which also encompasses feeding back other entities than precoders to assist the eNodeB in subsequent transmissions to the UE. Such other information may include channel quality indicators, CQIs, as well as transmission rank indicator, RI.

For the LTE uplink, the use of closed-loop precoding means the eNodeB is selecting precoder(s) and transmission rank and thereafter signals the selected precoder that the UE is supposed to use.

The transmission rank, and thus the number of spatially multiplexed layers, is reflected in the number of columns of the precoder. For efficient performance, it is important that a transmission rank that matches the channel properties is selected. Often, the device selecting precoders is also responsible for selecting the transmission rank one way is to simply evaluate a performance metric for each possible rank and pick the rank which optimizes the performance metric.

By way of example, precoding is used as part of WCDMA and LTE.

The inventors have recognized that for closed-loop precoding to be effective, it is important that the precoder is well matched to the state of the effective channel, including transmit and receive filters, channel responses of antenna cables and the actual propagation channel. It is a problem to design the codebook so as to have sufficiently fine granularity to accurately enough match MIMO channels encountered in reality.

Usually, codebooks are designed with a strict equal increment phase progression across the antenna array. It is a problem to construct a UE feedback for static phase relaxed MIMO channels, where the linear phase increment across the antenna array (as assumed in the DFT based codebooks of LTE) does not hold. It is thus a problem how to provide feedback for such channels.

For maximum performance, the precoding element should be chosen to match the effective channel(s) including transmit and receive filters, channel responses of antenna cables and of course the actual propagation channel. If the effective channel(s) varies over the bandwidth allocated to communication, then there is a need to adapt the precoding over frequency as well, in order to get the best possible match with the frequency-selective channel. Naturally, this affects the signaling of precoder elements in that a finer frequency granularity of the feedback and forward link signaling may be needed.

For simplicity, without loss of generality, a few examples will be outlined in the following with reference to LTE and moreover viewing the eNodeB as the transmitter and the UE as the receiver. Nevertheless, it should be noted that the proposed technology can also be applied with the roles of eNodeB and UE reversed, e.g. for calibration of the UE transmit chain using measurements at eNodeB.

Let $H_{RP}(f)$ denote the frequency response of the radio-propagation channel, then the effective channel can be modeled as:

$$H_{eff}(f) = H_{Rx}(f) H_{RP}(f) H_{Tx}(f), \quad (2)$$

where $H_{Rx}(f)$ and $H_{Tx}(f)$ are the frequency responses of the receiver and the transmitter respectively. Generally, the frequency selectivity induced by the receiving antennas and filters, $H_{Rx}(f)$, can be accounted for as part of the receive processing because the channel knowledge at the receiver is typically much better than at the transmitter. Moreover $H_{Tx}(f)$ typically do not fade over frequency (the gains do not change substantially) but rather induce phase rotations, which in addition are rather stable over time.

Mismatched transmit antennas and filters is however more problematic since that causes fast variations in $H_{Tx}(f)$, which is problematic for channel dependent closed loop precoding, where the received signal, y(f), can be modeled as:

$$y(f) = H_{eff}(f) W(f) x(f), \quad (3)$$

where x(f) are the modulated information carrying symbols.

However, for the precoding to match the effective channel the frequency-selectivity of the precoder must match the frequency-selectivity of the effective channel.

A common model for the impulse response of the transmitter, which models the transmit delays of each Tx antenna, is given by:

$$H_{Tx}(\tau) = \mathrm{diag}(\beta_1 \delta(\tau - \tau_1), \ldots, \beta_{N_{Tx}} \delta(\tau - \tau_{N_{Tx}})), \quad (4)$$

where $\beta_i$, $i = 1, \ldots, N_{Tx}$ are complex valued constants per TX antennas, which corresponds to the frequency response:

$$H_{Tx}(f) \propto \mathrm{diag}(|\beta_1| e^{\omega_1 - j 2\pi \tau_1 f}, \ldots, |\beta_{N_{Tx}}| e^{\omega_{N_{Tx}} - j 2\pi \tau_{N_{Tx}} f}). \quad (5)$$

In other words, compared to the strict phase and ideal amplitude assumption, used when developing LTE codebooks and having $\tau_1 = \tau_2 = \ldots = \tau_{N_{Tx}} = 0$, $|\beta_1| = |\beta_2| = \ldots = |\beta_{N_{Tx}}| = 1$, and $\omega_1 = \omega_2 = \ldots = \omega_{N_{Tx}} = 0$, the effective channel is in this application described as:

$$H_{eff}(f) = \quad (6)$$
$$H_{eff}^{calibrated}(f) \cdot \mathrm{diag}(|\beta_1| e^{\omega_1 - j 2\pi \tau_1 f}, \ldots, |\beta_{N_{Tx}}| e^{\omega_{N_{Tx}} - j 2\pi \tau_{N_{Tx}} f})$$

Hence, the relative phase between the Tx antennas is rotated over frequency; for example, the relative phase between antenna m and n is rotated by the phase $2\pi(\tau_n - \tau_m)f$. In addition, there may be a static (frequency independent) phase relaxation introduced per antenna channel by the (non-zero) terms $\omega_1, \omega_2, \ldots, \omega_{N_{Tx}}$.

If the bandwidth B is larger or same order of magnitude as $$\frac{1}{2\pi \Delta \tau_{max}},$$

where $$\Delta\tau_{max} = \max_{m,n}|\tau_m - \tau_n|, \quad (7)$$

then there is a significant phase rotation within the band.

Put in a different way, if the maximum tolerated relative phase rotation in a subband is x radians, then the subband bandwidth, $B_{SB}$, is upper bounded as:

$$B_{SB} \leq \frac{x}{2\pi\Delta\tau_{max}}. \quad (8)$$

Hence, for traditional precoding/beamforming, the subband bandwidth in which a precoder is efficient is upper bounded by (8). This is in particular restricting for wideband precoding that is essentially matched to the spatial correlation statistics of the channel.

$$R_{eff,Tx}(f) = E\{H_{eff}^H(f)H_{eff}(f)\} \approx H_{Tx}^H(f)E\{H_{RP}^H(f)H_{RP}(f)\}H_{Tx}(f) \quad (9)$$

It is well known that the spatial correlation statistics of the radio propagation channel is well approximated as constant over the bandwidth:

$$R_{Tx,RP} = E\{H_{RP}^H(f)H_{RP}(f)\}, \quad (10)$$

and the frequency selectivity of the transmit covariance matrix of the effective channel:

$$R_{eff,Tx}(f) = H_{Tx}^H(f)R_{Tx,Rp}H_{Tx}(f) \quad (11)$$

is thereby more or less completely induced by frequency response of the transmit filters and antennas, $H_{Tx}(f)$. In other words, with perfectly calibrated antennas, a precoder/beamformer tuned to the spatial channel statistics is efficient over the entire bandwidth, which is highly useful in correlated channel environments. With non-calibrated antennas, the precoder will only be valid on subbands of bandwidths limited by (8).

An aspect of the proposed technology concerns a channel state feedback procedure to be used in wireless communication systems. In a particular example, the UE feedback and eNB procedures enables a reduction of the static ($\omega_k$, $k=0, \ldots, K-1$) phase relaxation and/or time misalignment $\Delta_k$, $k=0, \ldots, K-1$ between each transmitter antenna port k and (the receiver chain of) a respective receive antenna. Static phase relaxation means that the phase shift is not related to a time misalignment between different antenna ports. Instead, it is related to non-frequency dependent phase and possibly also amplitude differences among the antenna ports. Reasons for the static and frequency dependent relaxations could be different antenna cable lengths per antenna port or due to angular dispersion in the radio channel and so forth.

An example of an overall procedure for channel state feedback, here exemplified by CSI feedback, in the presence of such phase relaxation comprises:

The estimation in the UE of the channel from each eNB transmitter antenna port to a UE receiver antenna, typically also including the receiver chain such as cables and filters, using antenna specific reference signals. This estimate channel includes the propagation channel as well as the signal path in the transmitter and receiver hardware.

Calculating a frequency-independent and/or inter-antenna port independent CSI part, e.g. CSI per antenna or as an offset to a given antenna CSI, associated with the phase relaxation.

Optionally, as a complement to the frequency-independent and/or inter-antenna port independent CSI part, also calculating another CSI part by considering all transmit antenna ports jointly, i.e. inter-antenna dependent. This is what normally is done when selecting a precoder as in LTE or High Speed Packet Access, HSPA.

Reporting CSI from a UE to the network in form of a high resolution transmit precoder adjustment that contains information about the phase relaxation.

On the other side, when the CSI feedback is received, the relaxation information can be used at the eNB when transmitting data to the UE so as to improve the link performance.

Optionally, it is possible to collect such CSI report from multiple UEs in the eNB and further processing them jointly, to obtain a (better) estimate of the phase relaxation of the channel.

Further embodiments relate to more details of the procedure in both UE and eNB in order to improve the estimation accuracy or to characterize the quality of the phase compensation values.

An eNB may further use uplink measurements in conjunction with precoding feedback from the UE to jointly calibrate the transmit and receive paths of the eNB and to determine downlink precoding matrices.

The proposed technology may compensate for hardware imperfections as well as differences in the channels due to a non-zero angular spread.

In a particular aspect, the proposed technology concerns a method for closed loop channel state information feedback in a wireless communication system such as LTE. The method can be used to enable compensation for channel propagation errors that are related to static phase and/or amplitude differences between the channels from different antenna ports to a receiver antenna. In some embodiments, both frequency-independent and frequency dependent differences can be compensated for. In the following description, focus will be on phase error compensation, but the method may be extended to cover amplitude differences as well.

It may be useful to begin with a brief theoretical analysis of the problem and methodology. Later, non-limiting examples of practical solutions will be given, where codebooks are used.

By way of example, to initiate a CSI feedback procedure, the UE estimates the effective channel from each transmit antenna port to a receiver connected to a receive antenna, based on transmit antenna specific Reference Signals, RS. These RS signals could for instance be CRS, Channel State Information Reference Signal (CSI-RS) or Discovery Reference Signals, RDS, as currently present in LTE.

Let the true phase of the channel estimate from transmit antenna port k to receiver l on frequency (or in an OFDM based system, the subcarrier) f be denoted by $\Theta_{kl}(f)$. This phase quantity can be further written as:

$$\Theta_{kl}(f) = \varphi_{h,kl}(f) + \Delta_k f + \omega_k + \upsilon_l \quad (12)$$

where the first term $\varphi_{h,kl}(f)$ represents the phase variations due to the propagation channel and receive filters, $\Delta_k$ is a term which magnitude is related to the time delay induced by the channel and $\omega_k$, $\upsilon_l$ are the static phase errors of transmit antenna k and receive antenna l respectively. Note that the static error terms are not dependent on the frequency whereas the other terms may be.

In a flat fading and line of sight channel with zero angular spread, and a homogeneous co-polarized linear equally spaced antenna array comprising elements with the same antenna patterns, the propagation channel dependent phase term, relative to the first antenna with k=0, can be further written as:

$$\varphi_{h,kl}(f)=\Psi_h(\theta)k \quad (13)$$

That is, the phase of the channel from two adjacent transmit antennas to any receive antenna differs by a constant $\Psi_h(\theta)$ that depends on the direction vector d of departure (DoD) from the eNodeB to the UE if $\Delta_k f+\omega_k+\upsilon_l$ is ignored. Note that this direction vector is a three dimensional vector in general as the UE may be positioned in elevation as well as azimuth angle with respect to the eNB. Note also the channel expression does not depend on the receive antenna. This is the plane wave assumption where the receive array antennas is in the plane perpendicular to the direction vector. However, if this antenna array alignment does not hold, then the channel will depend on the receive antenna index as well. In this application, this dependency will be captured in the receive antenna specific phase term $\upsilon_l$, which is an equivalent representation.

In the following, we will assume that the array and the UE are located in the same 2D-plane, so that the phase angle due to the direction vector d can be parameterized with a single DoD angle $\theta$.

Figure 5:
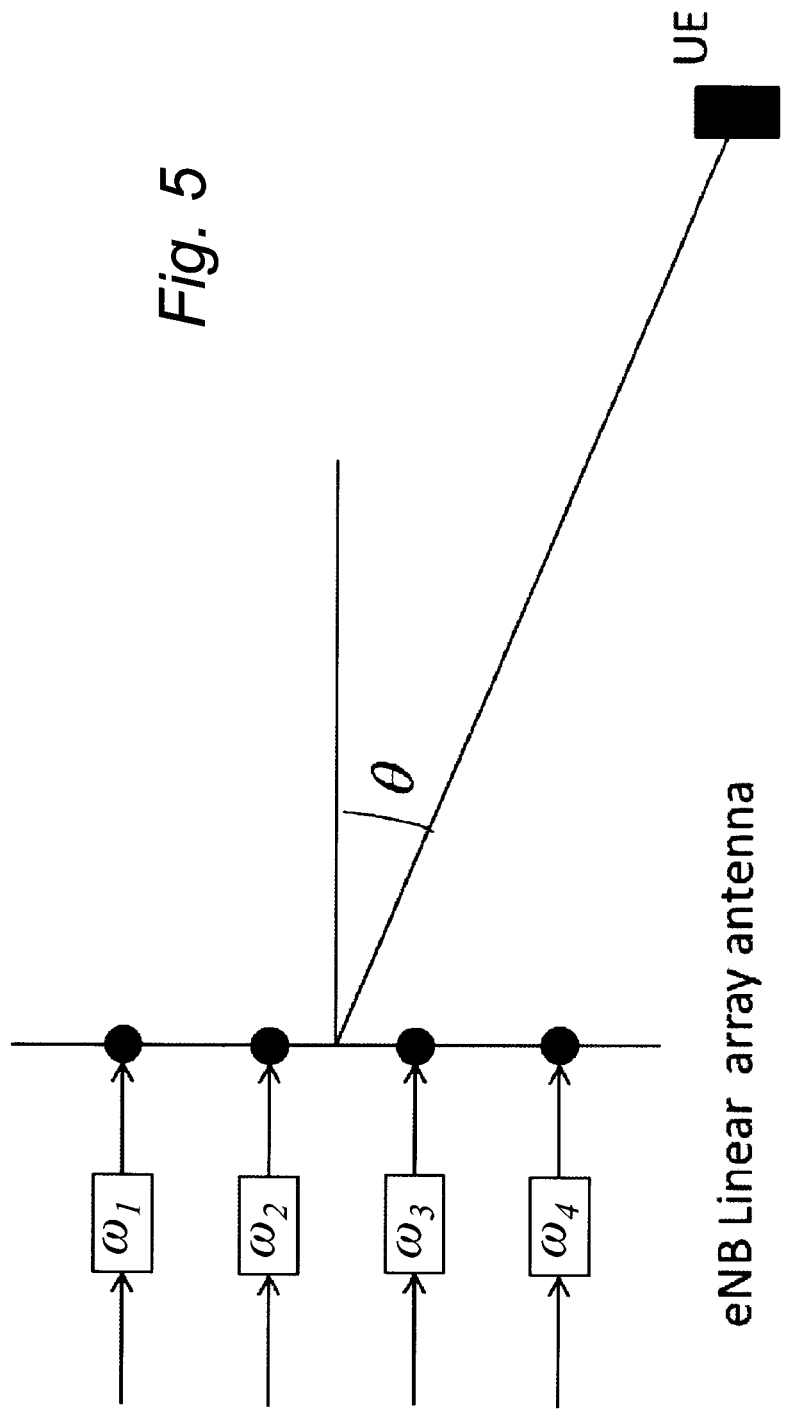
FIG. 5 is a schematic diagram illustrating an example of an eNB linear array antenna for transmission to a UE at a given direction of departure angle.

If the UE is at array broadside, then $\Psi_h(\theta=0°)=0$. FIG. 5 illustrates an example of a UE at a given non-zero DoD angle $\theta$ with respect to a linear array at the eNB. Each transmit antenna has its own static phase error $\omega_k$.

Hence, in this flat and line of sight channel we can write:

$$\Theta_{kl}(f)=\Psi_h(\theta)k+\Delta_k f+\omega_k+\upsilon_l \quad (14)$$

Assume for the sake of discussion that the UE can estimate and compensate for the time delays $\Delta_k$. Alternatively, the eNB compensate for this error using feedback from the UE. For example, this can be performed using the method set forth in reference [2]. Hence, in the following it can be assumed that these errors are compensated to zero, $\Delta_k=0$. In this example, the proposed technology mainly deals with finding and compensating for the static phase errors $\omega_k$ or both $\omega_k$ and $\Delta_k$. Note that the terms containing $\omega_k$ and $\Delta_k$ are independent for each antenna k (inter-antenna independent), however, the term $\Psi_h(\theta)k$ related to the DoD angle introduces a dependence between different antennas (inter-antenna dependent). This inter-antenna dependency is what is commonly utilized in a precoder codebook design as in LTE and will be discussed later.

Figure 6:
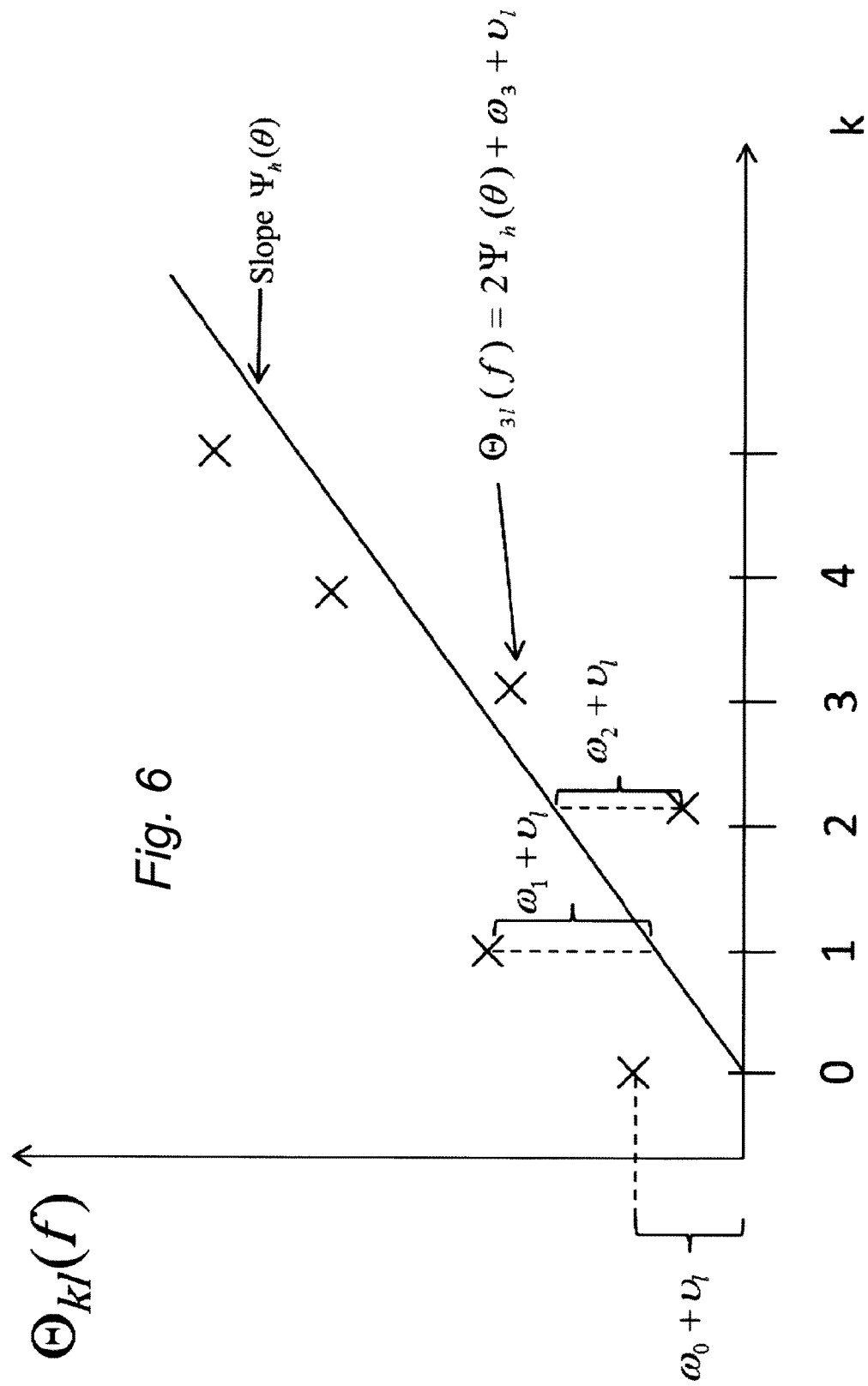
FIG. 6 is a schematic diagram illustrating an example of the values of the phase of a channel from transmit antenna port k to receive antenna l on frequency f for different transmit antenna ports.

The remaining phase equation for receive antenna l is thus:

$$\Theta_{kl}(f)=\Psi_h(\theta)k+\omega_k+\upsilon_l \quad (15)$$

where $\Theta_{kl}(f)$ is measured by the UE and $\omega_k$, $\upsilon_l$ are the unknowns. The DoD angle $\theta$ is also unknown so the phase increment $\Psi_h(\theta)$ is also an unknown. In FIG. 6 this is illustrated; the UE measures, for a given receive antenna, the phases from each transmit antenna marked with X's and the UE knows that these should ideally (without static errors) be placed along a line with an unknown slope given by $\Psi_h(\theta)$. The task in this illustrative example is to find the $\omega_k$ under the assumption of this model.

Figure 7:
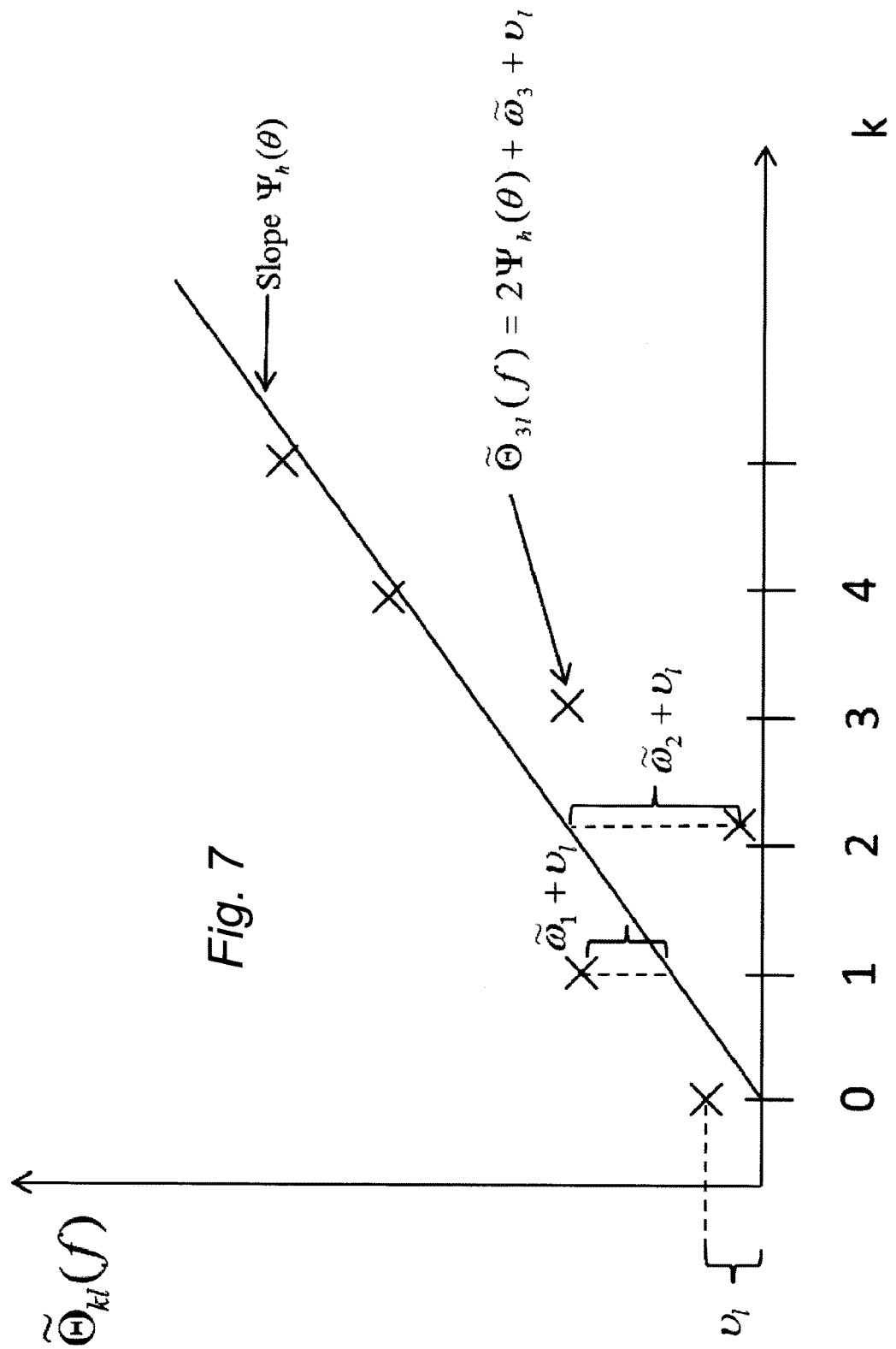
FIG. 7 is a schematic diagram illustrating an example of the values of the phase of a channel from transmit antenna port k to receive antenna l on frequency f for different transmit antenna ports in terms of relative phase differences.

Since only relative phase differences (between transmit antennas) are relevant for beamforming, we may introduce the relative phase difference $\tilde{\omega}_k=\omega_k-\omega_0$ with respect to an arbitrary transmit antenna for which we here choose the antenna with k=0 for sake of discussion. This will reduce the number of parameters to estimate by one. Hence, as illustrated in FIG. 7, we have these expressions in terms of relative phase differences:

$$\tilde{\Theta}_{kl}(f)=\Psi_h(\theta)k+\tilde{\omega}_k+\upsilon_l \text{ for } k>0$$

$$\tilde{\Theta}_{1l}(f)=\upsilon_l \text{ for } k=0 \quad (16)$$

Hence, if the UE has a single receive antenna, L=1, then there are K+1 unknowns where K is the number of transmitter antennas; the transmitter phase differences relative to the first antenna, the receiver phase and the unknown DoD angle:

$$\{\tilde{\omega}_1,\ldots\tilde{\omega}_{K-1},\upsilon_0,\theta\}. \quad (17)$$

In the general case with L receive antennas, there are K+L unknowns $\{\tilde{\omega}_1, \ldots, \tilde{\omega}_{K-1}, \upsilon_0, \ldots, \upsilon_{L-1}, \theta\}$ and to solve for the interesting parameters $\{\tilde{\omega}_1, \ldots, \tilde{\omega}_{K-1}\}$, then K+L equations is needed. Each receive antenna gives K measurements, hence with L receive antennas there are KL measurements available. If KL≥(K+L) then the parameters $\{\tilde{\omega}_1, \ldots, \tilde{\omega}_{K-1}, \upsilon_0, \ldots, \upsilon_{L-1}, \theta\}$ can be estimated. For a typical small MIMO system with K=L=2, then all four parameters $\{\tilde{\omega}_1, \upsilon_0, \upsilon_1, \theta\}$ can be estimated by the UE. The estimation could be performed jointly for the parameters, by forming a linear system of equations:

$$[\tilde{\Theta}_{00}\tilde{\Theta}_{01}\ldots\tilde{\Theta}_{K-1,L-1}]^T=A[\{\tilde{\omega}_1,\ldots,\tilde{\omega}_{K-1}, \upsilon_0,\ldots,\upsilon_{L-1},\theta\}]^T+n \quad (18)$$

where n is the measurement noise vector and A is the known model matrix and solving for the parameter vector.

The parameters can for instance be determined by minimizing the sum squared error between the KL measurements and the model:

$$\min_{\{\tilde{\omega}_1,\ldots,\tilde{\omega}_{K-1},\upsilon_0,\ldots,\upsilon_{L-1},\theta\}} \sum_{l=0}^{L-1}\sum_{k=0}^{K-1} \left|(\tilde{\Theta}_{kl}(f)-\Psi_h(\theta)k+\tilde{\omega}_k+\upsilon_l)\mathrm{mod}(-\pi,\pi)\right|^2 \quad (19)$$

where $\tilde{\omega}_0=0$ and where x mod($-\pi,\pi$) is the modulo $2\pi$ wrapping of x to the interval ($-\pi,\pi$].

Alternatively, many other well-accepted optimization methods can be used.

The estimated static phase differences on the transmit side $\tilde{\omega}_k$ are then fed back to the eNB from the UE for antennas k=2, . . . , K. In one embodiment, the static errors are fed back to the eNB in a higher layer measurement report.

Note that the method also allows for a calibration of the L receivers in the UE since the parameters $\{\upsilon_0, \ldots, \upsilon_{L-1}\}$ are also obtained in the process.

A quantized $\hat{\theta}_k$ value of the estimated DoD angle $\theta$ may also be provided in the measurement report. In the most general case, where the antenna array response is unambiguous over DoD all angles, $\theta$ may be quantized over all angles similarly for example such that $$\hat{\theta} \approx \in \frac{\pi}{128}\{-128,-127,-126,\ldots,127\}.$$

If a linear antenna array is used, then DODs of plane waves arriving in front of or behind the array are ambiguous, and the range of $\tilde{\theta}$ should be +/−90° with respect to a line normal to the axis of the antenna array, and so a suitable quantization in this case is $$\tilde{\theta} \approx \in \frac{\pi}{256}\{-128, -127, -126, \ldots, 127\}.$$

Examples Based on Feedback Using Codebooks

Since CSI feedback from the UE is quantized, the method above can be implemented with a codebook based CSI feedback solution.

In a particular example embodiment, the proposed technology is applied to an OFDM system with reporting for precoding. The reported precoder would in a perfect line of sight scenario and without phase relaxation be the same for all subcarriers, and the reported precoder of subcarrier k, $W_k$, is then simply given by:

$$W_k = W^{(W)} \quad (20)$$

where $W^{(W)}$ is the reported wideband precoder, typically belonging to a precoder codebook (an enumerated finite set of precoder matrices). In a particular example, that improves performance in channels with phase relaxation, the precoder is augmented by a diagonal precoder, $\Lambda$, which in general may depend on the subcarrier index k. The precoder is obtained by combining the wideband precoder and the diagonal precoder. Hence the codebook structure is:

$$W = \Lambda W^{(W)} \quad (21)$$

It is important to note here that $W^{(W)}$ is selected by the receiver to utilize the correlation of the channels from the different transmit antenna ports. Hence all transmit antenna ports are considered jointly when determining $W^{(W)}$. On the other hand, the elements in $\Lambda$ may be selected independently for each antenna port, by the receiver. This because the phase relaxation is independent between two transmit antennas.

In this example, the selected precoding matrix or vector W comprises at least two parts, one which is selected independently for each transmit antenna, and one part that is selected by jointly considering multiple transmit antenna ports, in order to utilize the channel correlation between antenna ports to improve e.g. receive SNR. Moreover, the inter-antenna independent antenna part may further include a static phase relaxation part and a frequency dependent phase relaxation part where the CSI feedback of the frequency dependent part may be used by the eNB to compensate for time misalignment between transmit antenna ports.

A common structure of $W^{(W)}$ is to use a column from discrete Fourier transform (DFT) matrix as the precoding vector since this is then a good approximation to a spatially matched filter to a line of sight channel. The factor $\Lambda$ on the other hand, has an independent component for each antenna port, that is, the diagonal elements of the matrix $\Lambda$ have no mutual dependence.

Hence, a key feature in this particular example is a precoder feedback codebook structure having one part that utilizes correlation between the channel from the transmit antenna ports and another part where the codebook elements is independently selected for each antenna port (i.e. related to at least $\omega_k$ and possibly also $\Delta_k$).

In a particular example embodiment, the diagonal precoder is given by:

$$\Lambda = \Lambda_s = \begin{bmatrix} e^{j\alpha_1} & & 0 \\ & \ddots & \\ 0 & & e^{j\alpha_K} \end{bmatrix}, \quad (22)$$

where $\Lambda_s$ indicates that this matrix is static and thus not frequency dependent and is parameterized by the parameters $\alpha_1, \ldots, \alpha_K$. The reported precoder is in this case the same for each subcarrier and is thus fully determined by $\alpha_1, \ldots, \alpha_K$ and $W^{(W)}$. In another, preferred, embodiment, a different codebook structure is introduced so that both static and frequency dependent correction can be made, hence the diagonal precoder matrix $\Lambda$ becomes:

$$\Lambda = \Lambda_f \Lambda_s = \begin{bmatrix} e^{jf\tau_1} & & 0 \\ & \ddots & \\ 0 & & e^{jf\tau_K} \end{bmatrix} \begin{bmatrix} e^{j\alpha_1} & & 0 \\ & \ddots & \\ 0 & & e^{j\alpha_K} \end{bmatrix} = \quad (23)$$

$$\begin{bmatrix} e^{j(f\tau_1+\alpha_1)} & & 0 \\ & \ddots & \\ 0 & & e^{j(f\tau_K+\alpha_K)} \end{bmatrix}$$

The reported precoder matrix is then frequency dependent due to the dependency of the term f, which corresponds to the subcarrier index and/or frequency and $\Lambda_f$ is parameterized by parameters $\tau_1, \ldots, \tau_K$. For each subcarrier the precoder is thus fully determined by $\alpha_1, \ldots, \alpha_K, \tau_1, \ldots, \tau_K$ and $W^{(W)}$. The reported precoder matrix could also be taking into account inter-antenna-independent amplitude differences, in which case the diagonal precoder $\Lambda$ becomes:

$$\Lambda = \Lambda_a \Lambda_f \Lambda_s = \begin{bmatrix} r_1 & & 0 \\ & \ddots & \\ 0 & & r_K \end{bmatrix} \begin{bmatrix} e^{jf\tau_1} & & 0 \\ & \ddots & \\ 0 & & e^{jf\tau_K} \end{bmatrix} \begin{bmatrix} e^{j\alpha_1} & & 0 \\ & \ddots & \\ 0 & & e^{j\alpha_K} \end{bmatrix} = \quad (23')$$

$$\begin{bmatrix} r_1 e^{j(f\tau_1+\alpha_1)} & & 0 \\ & \ddots & \\ 0 & & r_K e^{j(f\tau_K+\alpha_K)} \end{bmatrix}$$

where $r_k$ is the amplitude of transmit antenna port k.

In a particular example, the values of the static phase compensation parameters $\alpha_k$ may be constrained to a finite set.

It is also possible, as an alternative or a complement, to provide the channel state feedback only for a subset of the elements in the diagonal matrix $\Lambda$.

Now, assuming rank 1 feedback and a DFT based precoder with half wavelength spacing between the antenna elements, codebook structure is as follows:

$$W^{(W)} = \begin{bmatrix} 1 \\ q^{K-1} \\ q^{2(K-1)} \\ \vdots \\ q^{(K-1)(K-1)} \end{bmatrix} \quad (24)$$

where $q=e^{-j\pi\theta/K}$ and $\theta$ is a parameter that is related to the pointing angle $\theta$ of the resulting beam. The UE thus determines the parameters $\alpha_1, \ldots, \alpha_K$ and $W^{(W)}$ or equivalently using the codebook, the set of parameters $\alpha_1, \ldots, \alpha_K, \theta$ that optimize some criterion, for instance the equivalent SNR gain or the capacity.

The method can be applied to any rank r of the matrix $W^{(W)}$ selected for CSI feedback. In any case, the reported precoder is pre-multiplied with the diagonal matrix $\Lambda$.

As example of codebook element search criteria, the UE may maximize the Frobenius norm of the equivalent channel as:

$$\max_{\tau_1,\ldots,\tau_K,\omega_1,\ldots,\omega_K,\theta} \|H\Lambda W^{(W)}\|_F^2 \quad (25)$$

where H is the measured MIMO channel on a subcarrier or a subband, to determine the parameters $\tau_1, \ldots, \tau_K, \alpha_1, \ldots, \alpha_K, \theta$. Alternatively:

$$\max_{\tau_1,\ldots,\tau_K,\omega_1,\ldots,\omega_K} \|R\Lambda W^{(W)}\|_F^2 \quad (26)$$

where R is the estimated wideband covariance matrix of the channel.

As another alternative, the UE may match the dominant signal subspace of the equivalent channel H. In this case, the UE maximizes:

$$\max_{\tau_1,\ldots,\tau_K,\omega_1,\ldots,\omega_K,\theta} \mathrm{Re}(e_{max}^H \Lambda W^{(W)}) \quad (27)$$

where $e_{max}$ is the Eigenvector corresponding to the largest Eigenvalue of estimated wideband covariance matrix R of the channel H and Re(x) extracts the real part of x.

Example—Finite Alphabet for the Diagonal Codebook

Sometimes it is useful to have a finite alphabet in the diagonal precoder report so that feedback overhead is reduced. In a refined example embodiment, the values of the static phase compensation parameters $\alpha_k$ are constrained to a finite set, for example corresponding to a phase shift keying constellation:

$$I=\{\varphi_1,\ldots,\varphi_{|I|}\} \quad (28)$$

In a further embodiment, the UE selects $W^{(W)}$ from a codebook of precoding vectors with different pointing directions $\theta_i$, that is:

$$W^{(W)} \in \left\{ \begin{bmatrix} 1 \\ q_1^{K-1} \\ q_1^{2(K-1)} \\ \vdots \\ q_1^{(K-1)(K-1)} \end{bmatrix}, \begin{bmatrix} 1 \\ q_2^{K-1} \\ q_2^{2(K-1)} \\ \vdots \\ q_2^{(K-1)(K-1)} \end{bmatrix}, \ldots, \begin{bmatrix} 1 \\ q_Q^{K-1} \\ q_Q^{2(K-1)} \\ \vdots \\ q_Q^{(K-1)(K-1)} \end{bmatrix} \right\} \quad (29)$$

where $q_i = e^{-j\pi\theta_i/K}$ is the kernel.

Figure 8A:
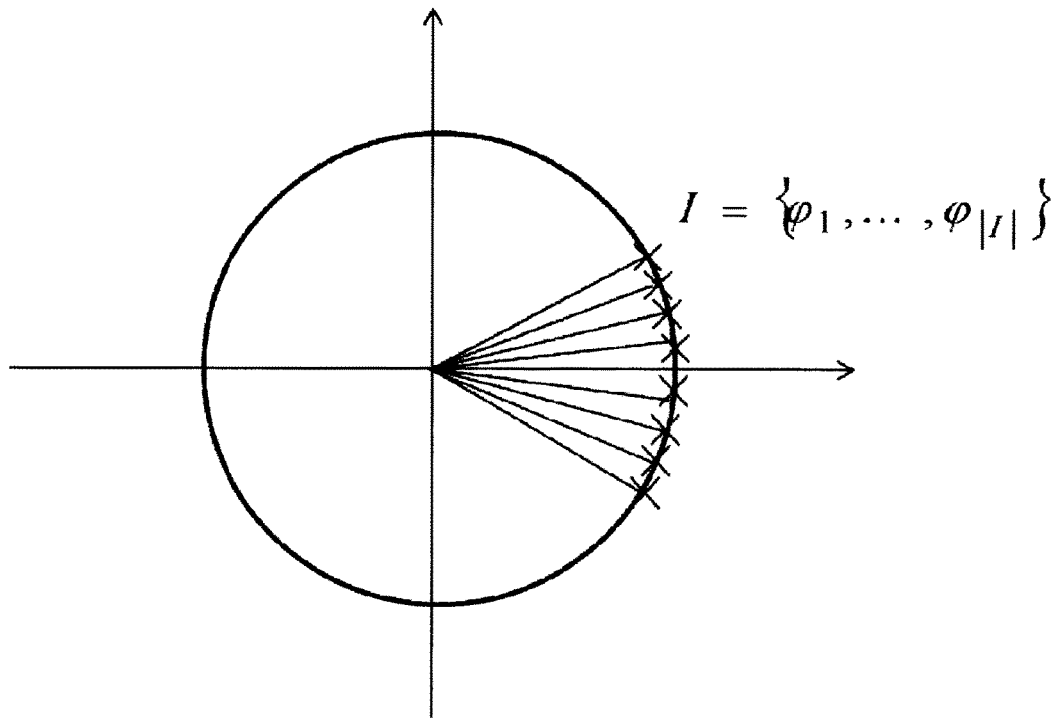
FIG. 8A is a schematic diagram illustrating an example of the unit circle in the complex plane where a number of different angles are located relatively close to zero angle.

The set $I=\{\varphi_1, \ldots, \varphi_{|I|}\}$ of the static phase compensation values $\alpha_k$ in the diagonal matrix will then be focused on values close to zero error. The idea behind this is that the $W^{(W)}$ models the linear slope and the diagonal matrix $\Lambda_s$ adjusts for the residual static errors $\omega_k$ per antenna port. Assuming that these static errors are relatively small, the set $I=\{\varphi_1, \ldots, \varphi_{|I|}\}$ could be densely sampled around zero error. FIG. 8A illustrates an example showing the unit circle in the complex plane and where eight angles are sampled around zero angle. Hence, these angles will be the basis for building the codebook for $\Lambda_s$ as these are the possible angles for each diagonal element in $\Lambda_s$.

Figure 8B:
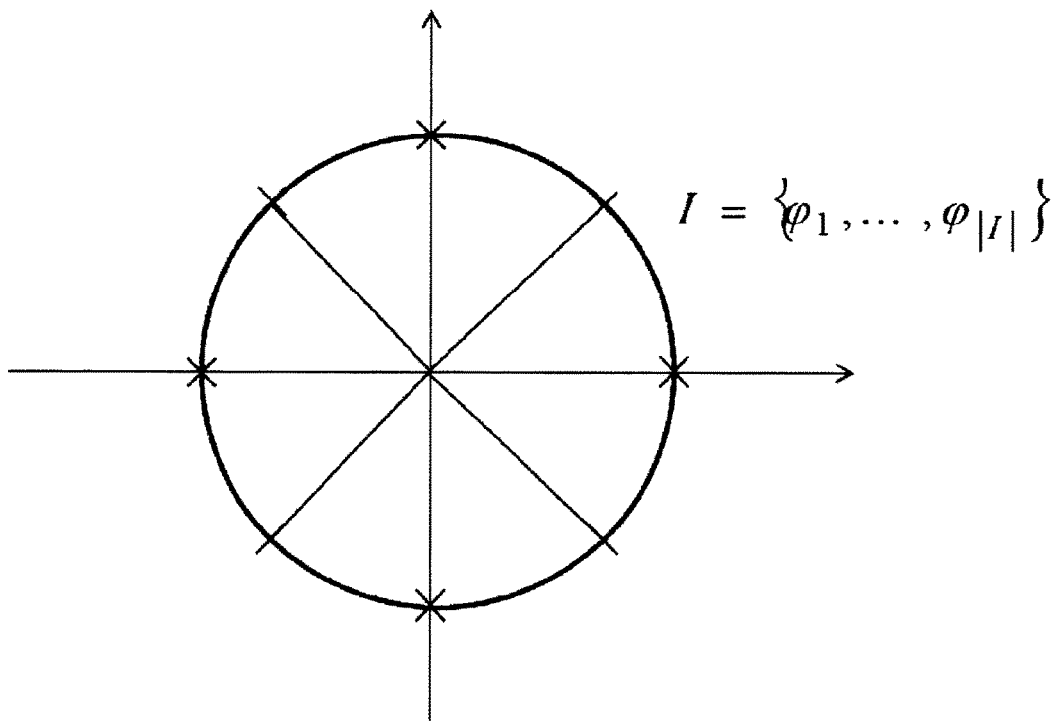
FIG. 8B is a schematic diagram illustrating an example of the unit circle in the complex plane where a number of different angles are uniformly distributed over the entire unit circle.

In an alternative embodiment, it is recognized that sometimes the static errors $\omega_k$ per antenna port may be totally random, i.e. uniformly distributed in the range $(-\pi, \pi]$. In this case it is better to directly find the phase term per antenna port without taking the intermediate step of finding a linear phase difference between antenna ports. Hence, in this embodiment, the precoding vector in the $W^{(W)}$ contains only a single element:

$$W^{(W)} \in \left\{ \begin{bmatrix} 1 \\ 1 \\ \vdots \\ 1 \end{bmatrix} \right\} \quad (30)$$

whereas the codebook for a diagonal element of $\Lambda_s$ contains uniformly sampled angles on the unit circle. FIG. 8B illustrates an example that shows the quantization to eight different angles.

In essence, in the static phase compensation only case, the UE can then be viewed as selecting a precoder:

$$W = \begin{bmatrix} e^{j\alpha_1} \\ \vdots \\ e^{j\alpha_K} \end{bmatrix} \quad (31)$$

where each of $\alpha_1, \ldots, \alpha_K$ correspond to a PSK alphabet.

As been discussed above this and the other embodiments can be combined with UE reporting that is suitable for also capturing time delays. The UE would then select a precoder with the structure:

$$W = \begin{bmatrix} e^{jf\tau_1} & & 0 \\ & \ddots & \\ 0 & & e^{jf\tau_K} \end{bmatrix} \begin{bmatrix} e^{j\alpha_1} \\ \vdots \\ e^{j\alpha_K} \end{bmatrix} = \begin{bmatrix} e^{j(f\tau_1+\alpha_1)} \\ \vdots \\ e^{j(f\tau_K+\alpha_K)} \end{bmatrix} \quad (32)$$

where each of $\tau_1, \ldots, \tau_K$ can be taken from a finite alphabet and where f may denote frequency or subcarrier index. Note also that in an alternative embodiment, the first element in the above precoder W could be fixed to one and the other elements would then capture relative phase differences.

Alternatively, a subband precoder report can be used, for which the frequency dependent errors are negligible. In this case, the precoder structure would be:

$$W = \begin{bmatrix} e^{j\alpha_1} \\ \vdots \\ e^{j\alpha_K} \end{bmatrix} \quad (33)$$

The UE can determine $\alpha_1, \ldots, \alpha_K$ and $\tau_1, \ldots, \tau_K$ either jointly for all receive antennas or separately for each receive antenna. In the latter case, one precoder for each receive antenna would be reported. A possibility is also to feedback CQI computed based on the assumption that a precoder from any of the above embodiments is used at the eNodeB. These precoders having the above mentioned structure could be part of a larger precoder codebook having additional precoder elements. In particular, then this could represent the rank one part of a precoder codebook.

In an embodiment, quantized relative delay values $\Delta\tilde{\tau}_i$, derived from estimated time delays $\tau_i$ may also be used in the codebook and thus provided in a CSI measurement report. As discussed above, the maximum bandwidth over which a given amount of phase error can be tolerated is:

$$B_{SB} \leq \frac{x}{2\pi \Delta \tau_{max}}.$$

A suitable value of phase error can be 10 degrees, and so if the phase error is to be within limits over a 20 MHz carrier bandwidth, the maximum tolerable error is $$\Delta \tau_{max} \leq \frac{10\pi/180}{2\pi(20)10^6} \approx 1.4 \text{ ns}.$$

Existing LTE systems have a minimum timing alignment error requirement of 65 ns, and so this value may be used as one guideline for the upper bound on the delay expected between any two elements of an array. A uniform quantizer may be used, in which case the number of values should be at least 2(65 ns/1.4 ns)≥96, where the factor of two allows for both positive and negative relative delays. The relative delay values can therefore be quantized by first finding the delay relative to the first element of the antenna array $\Delta\tau_i = \tau_i - \tau_1$, and then selecting the closest value of each of the $N_{Tx}-1$ relative values such that $\Delta\tilde{\tau}_i \approx 65/64\{-64, -63, -62, \ldots, 63\}$.

The codebook augmentation $W = \Lambda W^{(W)}$ allows for compensation of the static error terms in each channel from the eNB to the UE as well as frequency dependent terms due to time misalignments in the channel. Note that these static errors may be due to hardware differences between the antenna ports, but it may also be due to non-zero angular spread in the channel (where the channel does not perfectly match the precoding vector structure in the codebook for $W^{(W)}$). Hence, the proposed technology may improve the performance of existing DFT based precoding vectors by the diagonal vector $\Lambda$. Hence the resulting effective codebook for $W = \Lambda W^{(W)}$ can be seen as a super-resolution codebook.

A drawback with such super resolution codebook is the increased feedback overhead. Assuming K=8 antennas at the eNB, a codebook for $W^{(W)}$ with 64 possible vectors and static phase error compensation with a finite set of I= $\{\varphi_1, \ldots, \varphi_{11}\}$ with 16 elements, requires 38 bits feedback (or 34 bits in case one antenna is used as a reference antenna and relative feedback is used). There are several method to reduce this overhead, for example as in the following embodiments.

Example: Reducing Super Resolution Codebook Overhead

Assume that the normal codebook is given by $W^{(W)}$ and the super resolution codebook is given by the augmented codebook $\Lambda W^{(W)}$.

In an example embodiment, the use of the codebook $\Lambda W^{(W)}$ is triggered by the eNB. So whenever eNB needs more accurate channel information, the eNB signals to the UE to use $\Lambda W^{(W)}$ instead of $W^{(W)}$. This could be a single report as in aperiodic feedback operation.

Moreover, if the number of eNB antennas K>2, then the UE may feedback such super resolution feedback only for a subset of the antenna elements in $\Lambda$ and the other remains to be 1. For example, if only the super resolution is fed back for a single antenna in a given feedback instance, the diagonal precoder may look like the following equation. In the next feedback instance, the next diagonal element is different from one, all others are one and so forth. After some time, feedback from all K antenna ports has been signalled to the eNB from the UE.

$$\Lambda = \begin{bmatrix} e^{j(f\tau_1 + \alpha_1)} & & 0 \\ & 1 & \\ 0 & & 1 \end{bmatrix} \quad (34)$$

Example: CQI Calculation and Feedback

As discussed above, the UE may calculate precoding feedback using a precoding matrix from a normal codebook or from an augmented codebook.

When the UE reports using the augmented codebook, it determines $\alpha_1, \ldots, \alpha_K$ and possibly $\tau_1, \ldots, \tau_K$, that the eNB could use to help correct for the static errors $\omega_k$ and possibly time errors $\Delta_k$ in later transmissions. Therefore, one possibility is that the UE uses the last value of $\alpha_1, \ldots, \alpha_K$ $\tau_1, \ldots, \tau_K$, it determined from the augmented codebook as correction factors when calculating CQI using the normal codebook. However, an eNB may use feedback from multiple UEs to determine the correction factors it uses to remove the static errors $\omega_k$, and so it is likely that the eNB will use correction factors different from those a single UE may determine.

Therefore, in an embodiment, when a UE is configured to report both on the normal and augmented codebook, then it always calculates CQI using the normal (non-augmented) codebook using measurements of downlink reference signals, but does not use a correction factor comprised within the augmented codebook.

Example: Increasing Estimation Accuracy at the eNB

For example, the eNB may collect and combine the super resolution feedback information from multiple UEs served by the eNB and thereby obtain better statistics in the estimation of the errors $\omega_k$ and/or $\Delta_k$ for antenna branch k. Moreover, despite using a finite alphabet in the codebook feedback, the use of multiple measurements from multiple UEs will reduce the effects of a finite codebook since the combined values are real valued integers and thus not restricted to the finite codebook. For instance, assume that $\alpha_k^u$ is the reported estimated value from UE #u and for transmit antenna port #k. The eNB may then combine estimates from multiple UEs as:

$$\hat{\omega}_k = \frac{1}{U} \sum_{u=1}^{U} \alpha_k^u \quad (35)$$

so as to form a better estimate of the static error $\omega_k$. The number of UEs is denoted by U.

Example: Using Measurements of UEs for Highly Spatially Correlated Channels

Furthermore, the calibration methods described above are most accurate when the channels between the eNB and UE have low angle spread, and therefore high correlation between antenna elements. A special case is line of sight. Therefore, in a further embodiment, the eNB may discard feedback from a UE u whose channel to the eNB is not line of sight (or does not have sufficiently high spatial correlation, e.g. an eigenvalue in the spatial correlation matrix of copolarized antenna elements substantially larger than the rest) rather than using its $\alpha_k^u$ to estimate the error $\omega_k$. Alternatively, an algorithm in the eNB selects to configure the augmented codebook feedback only for those UEs with a high probability of having a low angle spread channel to the eNB. The eNB can classify an eNB-UE channel as being low angle spread or not low angle spread using a variety of techniques as discussed further below.

In an example approach, the UE reports a rank indicator and possibly in addition a channel quality indication corresponding to one or more codewords in addition to the precoding information described above. A precoding indication is calculated for co-polarized elements, and a second precoding indication may be calculated for pairs of differently polarized elements. A rank threshold $T_{rank}$ is set to $T_{rank}=1$ if the precoding is only calculated for copolarized elements and set to $T_{rank}=2$ if precoding indications are calculated for both copolarized and differently polarized elements. If the UE u reports rank $rank_u > T_{rank}$ or a channel quality $CQI_u$ that is below a threshold, the eNB classifies the eNB-UE channel for UE u as not having low angle spread.

$rank_u > T_{rank}$ or $CQI_u < T_{CQI}$: not low angle spread otherwise: low angle spread (36)

In another example approach, the eNB computes a covariance matrix of channel measurements received from the UE on copolarized antenna elements and classifies the channel as low angle spread according to the condition number of the covariance matrix. The covariance $R_u$ can be computed using the estimate of the effective channel for UE u at subcarrier f and time instant t $\hat{H}_{eff,u}(f,t)$, and averaging over F subcarriers and T time instants using:

$$R_u = \frac{1}{FT}\sum_{f=1}^{F}\sum_{t=1}^{T}\hat{H}_{eff,u}^H(f,t)\hat{H}_{eff,u}(f,t) \quad (37)$$

An important aspect is that $R_u$ is computed using $\hat{H}_{eff,u}(f,t)$ that are sufficiently well separated in time such that multipath components arriving at substantially different angles but at similar delays will decorrelate, such that the condition number of $R_u$ captures the multipath angle spread, and therefore indicates that the channel does not have low angle spread. If there is sufficiently low delay spread, averaging across frequency will also better reflect the long term condition of $R_u$ and therefore whether the channel has low angle spread.

The condition number $\kappa(R_u)$ can then be computed using the maximum and minimum Eigenvalues of $R_u$, $\lambda_{max}(R_u)$ and $\lambda_{min}(R_u)$, respectively:

$\kappa(R_u) = \lambda_{max}(R_u)/\lambda_{min}(R_u)$ (38)

If $\kappa(R_u)$ is above a threshold (calculated below in decibels), then the channel for UE u is classified as low angle spread, and used to estimate the error $\omega_k$.

10 log $10(\kappa(R_u)) \geq T_{LOS}$: line of sight 10 log $10(\kappa(R_u)) < T_{LOS}$: not line of sight (39)

Example: Using Measurements of UEs at Widely Distributed Positions

By way of example, it is desirable to have channel state feedback from UEs located at widely distributed positions throughout the cell, especially those with a wide distribution of DoDs, in order to get the best estimates of the static phase errors $\omega_k$. In order to facilitate this, in an embodiment, the UE provides a metric of the position at which the static errors were measured. In one approach to the embodiment, the UE feeds back a quantized estimate of the DoD, $\tilde{\theta}_k$, as described above. Alternatively, the UE feeds back an indication of the precoding matrix $W^{(W)}$, as described above. Another alternative is to use measurement in the uplink to determine the DoD. When antenna array elements are correlated, UEs with different DoDs will tend to have different values of $\tilde{\theta}_k$ and $W^{(W)}$. The eNB may then select UEs that have well distributed values of $\tilde{\theta}_k$ or $W^{(W)}$ when calculating the static error estimates to improve the estimates' accuracy. The eNB may also compare static errors from UEs with DoDs that are far apart in order to test the accuracy of the static errors.

Example: Calibrating Using Both Uplink and Downlink Measurements

When the receive chain is not well calibrated, its estimate of the uplink channel response will be degraded. However, if the calibration error on both the uplink and downlink is fixed over some period of time, the uplink channel response estimates will be self-consistent over time, as well as consistent with downlink channel measurements. Therefore, it is possible to differentially calibrate the uplink and downlink channel responses, where uplink channel estimates made at the same time as downlink channel estimates are associated with each other, thereby allowing uplink measurements to be used to determine downlink precoding even when both the receiver and transmitter are not well calibrated.

In an example embodiment using uplink measurements to calculate downlink precoding matrix weights, the eNB first estimates the effective uplink receive channel $\hat{G}_{eff,u}(f,t)$, for user u over some range of frequency and span of time. At approximately the same span of time, the UE also determines and provides to the eNB the feedback used for calibration, which may include the precoding $\alpha_1, \ldots, \alpha_K$ and $W^{(W)}$ or the static errors $\omega_k$, as well as the corresponding CQI, and/or rank indication described above.

Given this information, the eNB can use uplink channel estimates to determine downlink precoding. When a new uplink channel estimate is sufficiently similar to a $\hat{G}_{eff,u}(f,t)$ that was observed before, the eNB can transmit to the UE using the associated precoding. However, $\hat{G}_{eff,u}(f,t)$ must somehow be quantized for storage, and only a limited number may be stored.

LTE precoding uses a limited number of bits to represent the precoding matrices. For example, Rel-8 PMI uses at most 4 bits, and the quantization for $W^{(W)}$ used herein could be 6 bits (as described above). Therefore, the uplink channel estimates to be stored can be associated with a relatively small number of PMIs.

An example embodiment then quantizes $\hat{G}_{\mathit{eff},u}(f,t)$ in the eNB using precoding feedback as channel state feedback. The precoding feedback can be $\alpha_1, \ldots, \alpha_K$ and $W^{(W)}$ or the quantized versions of the static errors $r_k$ (such as $\tilde{g}_k$ and $\tilde{p}_k$), and a rank indicator. The precoding feedback is calculated as described above, except using uplink channel estimates (and optionally covariance estimates) measured by the eNB, e.g. $\hat{G}_{\mathit{eff},u}(f,t)$ instead of downlink channel estimates measured by the UE. An index of the quantized precoding feedback (indicating both PMI and rank) calculated for the uplink by the eNB is then paired with the index of the quantized precoding feedback (indicating both PMI and rank) calculated for the downlink by the UE, and the pair of indices is stored. Assuming that there are 64 precoding matrices $W^{(W)}$ and up to rank 4 transmission, then there are 64*4*64*4=65536 different possible pairs. Therefore, the probability that each downlink precoding matrix with a given rank maps to an uplink matrix and rank can easily be tracked in an eNB and updated to keep track of slowly time varying channel differences. When using uplink measurements to determine downlink precoding, the eNB selects the downlink precoding matrix that was most frequently observed for the precoding and rank measured on the uplink.

Example: Implicit Feedback—Precoder Recommendation with CQI Report and Rank Indication In another embodiment of the invention, a precoder report augmented with a precoder super resolution codebook is combined with a channel quality indicator (CQI) report to signal the largest transport format, i.e. the number of information bits and modulation, that can be supported by the channel given that the precoder report and precoder frequency updates are followed by the transmitter. A rank indicator may also be provided, in which case the CQI indicates the largest transport format that can be supported by the channel given that the precoder report, precoder frequency updates, and rank indicator are followed by the transmitter. Thus, the super resolution codebook is taken into account when CQI is being computed, which illustrates the benefits of compensating the static errors as part of the precoder feedback.

Example: Compensation at the eNB

With knowledge of for instance the static errors $\hat{\omega}_k$ in the eNB, the eNB can compensate in baseband processing by applying an opposite phase shift $-\hat{\omega}_k$ of all signals transmitted from antenna k. Using the codebook feedback approach, this is obtained by multiplying the precoding matrix by the compensation matrix:

$$\Lambda_{S,C} = \begin{bmatrix} 1 & & 0 \\ & \ddots & \\ 0 & & e^{-j\omega_{K-1}} \end{bmatrix} \quad (40)$$

before applying the selected rank r precoder W.

Hence, the total precoder is $W_{tot} = \Lambda_{S,C} W$. The compensation matrix may also be applied to subsequent CSI-RS transmissions to reduce or remove the effects of time misalignment and/or static phase errors in subsequent CSI measurements.

At least some of the embodiments described herein have at least one of the following advantages:

A super resolution codebook report may to a large extent eliminate the precoder performance degradation caused by static phase errors in the effective channel imposed by, for example, non-calibrated antenna arrays.

Since the precoder update report (augmented part) is included as part of the precoder report and not, e.g., considered to be an independent quantity, the feedback generating device is automatically mandated to take the static parts of the effective channel into account when determining the precoder feedback. Thus, the precoder feedback can remain efficient even if the feedback generating device sees channels with large differences in e.g., cable lengths.

Similarly, other feedback signals that depend on the reported precoder, e.g. CQI, have a chance to take the static errors into account, thereby increasing the efficiency of those other feedback signals. There are also benefits in that there is support for (feedback generating) device specific compensation while at the same time ensuring that the devices take the compensation into account in other relevant parts of the feedback reporting, as explained above.

Calibration accuracy is improved by using feedback from UEs in line of sight conditions or those that are at widely distributed positions in the cell.

Calibration accuracy is also improved by estimating static errors using a principal eigenvalue of a received covariance matrix.

The transmit and/or receive chain of an eNB can be calibrated without dedicated hardware. This allows uplink measurements to be used for downlink precoding with less eNB hardware complexity.

Figure 9:
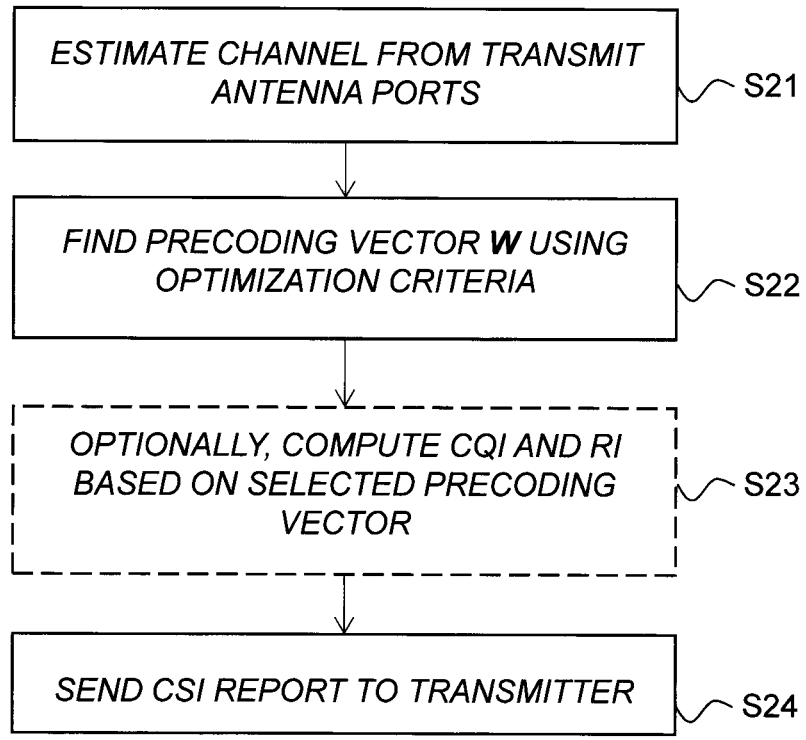
FIG. 9 is a schematic flow diagram illustrating an example of a method on the receiver side according to a particular embodiment.

FIG. 9 is a schematic flow diagram illustrating an example of a method on the receiver side according to a particular embodiment. The receiver first estimates (S21) the channel from all or a subset of the transmit antenna ports. Then, a precoder W is selected (S22) based on an optimization criterion. The precoder has a structure as described in any of the embodiments above. Optionally, the receiver also calculates or computes (S23) the CQI and rank associated with the selected PMI so as to have a complete CSI report, e.g. useful for PDSCH scheduling. The receiver then sends (S24) the CSI report to the transmitter.

Figure 10:
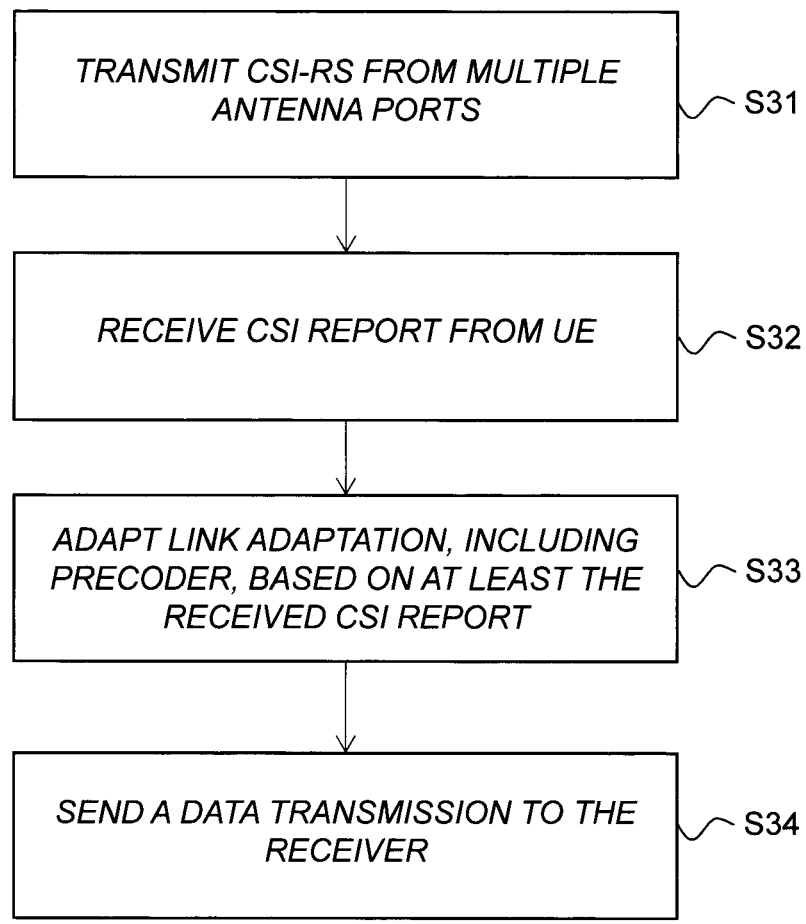
FIG. 10 is a schematic flow diagram illustrating an example of a method on the transmitter side according to a particular embodiment.

FIG. 10 is a schematic flow diagram illustrating an example of a method on the transmitter side according to a particular embodiment. The transmitter transmits (S31) a CSI-RS per antenna port for the receiver to perform measurements on. These CSI-RS are generated in baseband processing, hence the measurements performed by the receiver include the radio channel as well as hardware imperfections in terms of time delays and static phase errors. The transmitter then receives (S32) a CSI report from the receiver using the structured codebook. The transmitter then adapts (S33) the link adaptation when scheduling the particular receiver node based on the received CSI report, particularly the precoding matrix, which includes information about time misalignment and static phase difference among antenna branches. The data, e.g. PDSCH, is then transmitted (S34) to the receiver.

Figure 11:
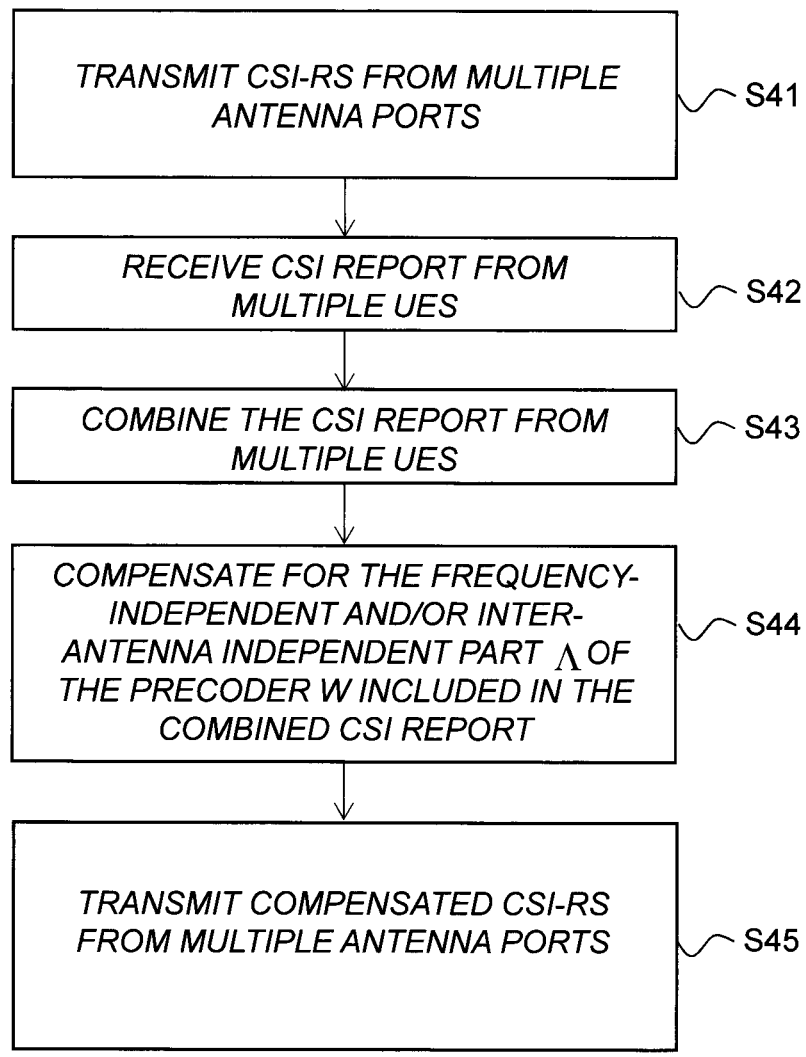
FIG. 11 is a schematic flow diagram illustrating an example of a method on the transmitter side according to yet another embodiment.

FIG. 11 is a schematic flow diagram illustrating an example of a method on the transmitter side according to yet another embodiment. The method is similar to that of FIG. 10, except that multiple CSI reports are received from multiple receiver nodes respectively and the transmit node jointly processes them by e.g. averaging parameters across different reports. The transmitter transmits (S41) CSI-RS per antenna port for the receivers to perform measurements on. The transmitter receives (S42) CSI reports from multiple UEs, and combines (S43) the CSI reports. The transmitter may then compensate (S44) for the frequency-independent and/or inter-antenna-independent part included in the combined CSI report. The transmitter may then transmit (S45) compensated CSI-RS from the multiple antenna ports.

Figure 18:
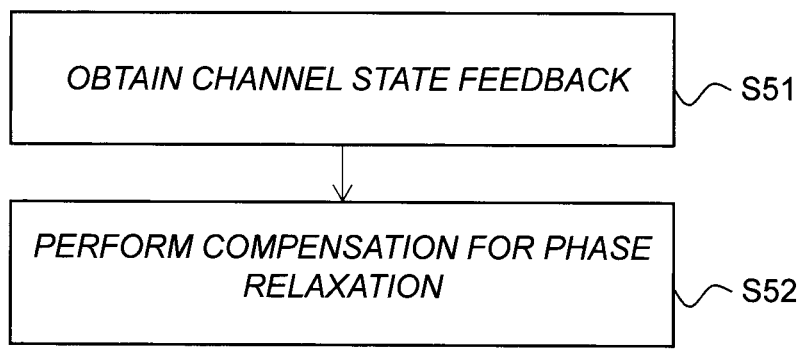
FIG. 18 is a schematic flow diagram illustrating an example of a method for compensating for phase relaxation.

FIG. 18 is a schematic flow diagram illustrating an example of a method for compensating for phase relaxation of at least a subset of the effective channels between a transmitter having multiple transmit antennas and a receiver having at least one receive antenna. The method comprises obtaining (S51) channel state feedback including at least a representation of frequency-independent and/or inter-antenna-independent channel state information associated with the phase relaxation of at least the subset of the effective channels between the transmitter and the receiver, each effective channel including a propagation channel, and signal paths in the transmitter and the receiver. The method also comprises performing (S52) compensation for the phase relaxation at least partly based on the channel state feedback including the representation of frequency-independent and/or inter-antenna-independent channel state information associated with the phase relaxation.

By way of example, the representation of the frequency-independent and/or inter-antenna-independent channel state information includes a representation of independent phase relaxations for at least a subset of the multiple transmit antennas. The phase relaxation, for each of at least a subset of the multiple transmit antennas, includes at least a static, frequency-independent phase relaxation part relating to a static phase error, denoted $\hat{\omega}_k$, associated with transmit antenna k, and the transmitter, with knowledge of the static phase error $\hat{\omega}_k$, performs phase error compensation in baseband processing by applying an opposite phase shift $-\hat{\omega}_k$ of signals transmitted from transmit antenna k.

In a particular example, as previously indicated, the static phase errors are compensated for by multiplying a precoding matrix W by a compensation matrix:

$$\Lambda_{S,C} = \begin{bmatrix} 1 & & 0 \\ & \ddots & \\ 0 & & e^{-j\omega_{K-1}} \end{bmatrix}$$

to provide a combined precoder structure $W_{tot} = \Lambda_{S,C} W$.

As used herein, the non-limiting terms UE or User Equipment or wireless device may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet PC with radio communication capabilities, a target device, a device to device UE, a machine type UE or UE capable of machine to machine communication, iPad, customer premises equipment (CPE), laptop embedded equipment (LEE), laptop mounted equipment (LME), Universal Serial Bus (USB) dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term network node may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations (BTSs), and even radio control nodes controlling one or more Remote Radio Units (RRUs), or the like.

In particular, the non-limiting general term "communication unit" may include a network node as defined above and/or a wireless device or UE as defined above.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides a communication unit configured to provide channel state feedback related to a wireless link between a transmitter having multiple transmit antennas and a receiver having at least one receive antenna. The communication unit is configured to determine channel estimates for at least a subset of the effective channels between the transmitter and the receiver, each effective channel including a propagation channel, and signal paths in the transmitter and the receiver. The communication unit is configured to determine frequency-independent and/or inter-antenna-independent channel state information associated with phase relaxation of at least the subset of the effective channels based on the channel estimates. The communication unit is configured to generate channel state feedback including at least a representation of the frequency-independent and/or inter-antenna-independent channel state information associated with the phase relaxation. The communication unit is configured to transmit the channel state feedback to the transmitter.

By way of example, each effective channel includes a propagation channel and signal paths in the transmitter and the receiver, from a respective transmit antenna port to and including at least part of a receiver chain connected to a respective receive antenna.

In a particular example, the communication unit is configured to generate and transmit the channel state feedback as part of a precoder report including the representation of the frequency-independent and/or inter-antenna-independent channel state information associated with the phase relaxation.

Preferably, the communication unit may be configured to determine the frequency-independent and/or inter-antenna-independent channel state information associated with the phase relaxation of at least the subset of the effective channels by determining the phase relaxation independently for each of at least a subset of the multiple transmit antennas, and the representation of the inter-antenna-independent channel state information includes a representation of the independently determined phase relaxations.

For example, the communication unit may be configured to determine the independently determined phase relaxation, for each of at least a subset of the multiple transmit antennas, including at least a static, frequency-independent phase relaxation part.

Optionally, the communication unit is configured to determine the phase relaxation, for each of at least a subset of the multiple transmit antennas, wherein the determined phase relaxation relates to a static phase error associated with a corresponding or respective transmit antenna.

As an example, the communication unit may be configured to generate channel state feedback where the representation of the independently determined phase relaxations corresponds to a diagonal matrix $\Lambda$ having phase relaxation related components in elements of a main diagonal.

For example, the communication unit may be configured to report the representation of the independently determined phase relaxations corresponding to the diagonal matrix $\Lambda$ with a representation of a precoder $W^{(W)}$ for providing a combined precoder structure $W=\Lambda W^{(W)}$.

The proposed technology also provides a communication unit configured to perform multi-antenna transmission from a transmitter having multiple transmit antennas to a receiver having at least one receive antenna. The communication unit is configured to receive channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver. The communication unit is configured to determine a transmission operation at least partly based on the channel state feedback including the representation of frequency-independent and/or inter-antenna-independent channel state information associated with the phase relaxation. The communication unit is configured to perform multi-antenna transmission according to the determined transmission operation.

By way of example, wherein each effective channel includes a propagation channel and signal paths in the transmitter and the receiver, from a respective transmit antenna port to and including at least part of a receiver chain connected to a respective receive antenna.

In a particular example, the communication unit is configured to receive the channel state feedback as part of a precoder report including the representation of frequency-independent and/or inter-antenna-independent channel state information associated with the phase relaxation.

For example, the communication unit may be configured to determine a precoder at least partly based on the channel state feedback including the representation of frequency-independent and/or inter-antenna-independent channel state information associated with the phase relaxation, wherein the communication unit is configured to perform multi-antenna transmission according to the determined precoder.

As an example, the communication unit may be configured to determine or generate the precoder by combining a diagonal matrix with a precoding matrix, where the diagonal matrix has phase relaxation related components in elements of a main diagonal generated based on the representation of frequency-independent and/or inter-antenna-independent channel state information associated with the phase relaxation.

Preferably, the communication unit may be configured to receive channel state feedback including a representation of independent phase relaxations for at least a subset of the multiple transmit antennas and to determine a transmission operation at least partly based on said channel state feedback, wherein the channel state feedback includes a representation of an independent phase relaxation for each of at least a subset of the multiple transmit antennas.

As an example, the independent phase relaxation, for each of at least a subset of the multiple transmit antennas, includes at least a static, frequency-independent phase relaxation part.

For example, each independent phase relaxation relates to a static phase error associated with a corresponding or respective transmit antenna.

In a particular example, the transmitter, with knowledge of the static phase error $\hat{\omega}_k$, is configured to perform phase error compensation in baseband processing by applying an opposite phase shift $-\hat{\omega}_k$ of signals transmitted from transmit antenna k.

By way of example, the communication unit may be configured to generate the precoder by augmenting a precoding matrix based on the independent phase relaxation(s) for at least a subset of the multiple transmit antennas.

Optionally, the communication unit is configured to generate the precoder by augmenting the precoding matrix, denoted $W^{(W)}$, by a diagonal matrix, denoted $\Lambda$, including independent phase relaxation(s) in elements of a main diagonal for providing a combined precoder structure $W=\Lambda W^{(W)}$.

As previously indicated, the communication unit described herein may be a network node or a wireless device.

Figure 12:
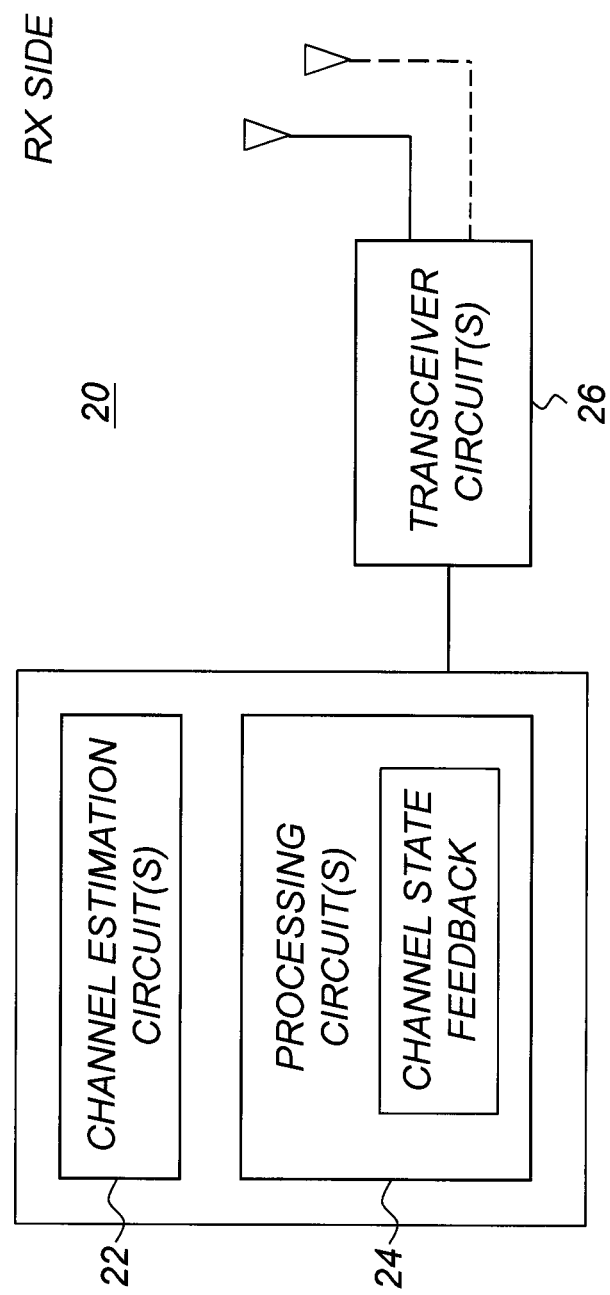
FIG. 12 is a schematic block diagram illustrating an example of a communication unit from the receiver perspective according to an embodiment.

FIG. 12 is a schematic block diagram illustrating an example of a communication unit from the receiver perspective according to an embodiment. The communication unit basically comprises channel estimation circuit(s) 22, processing circuit(s) 24, especially for generating channel state feedback, and transceiver circuit(s) 26 for receiving and/or transmitting relevant signals.

By way of example, there is thus provided a channel state feedback generating device 24 configured to generate channel state feedback related to a wireless link between a transmitter having multiple transmit antennas and a receiver having at least one receive antenna, The channel state feedback generating device 24 is configured to determine frequency-independent and/or inter-antenna-independent channel state information associated with phase relaxation of at least a subset of the effective channels between the transmitter and the receiver based on channel estimates for at least the subset of the effective channels. Each effective channel including a propagation channel, and signal paths in the transmitter and the receiver. The channel state feedback generating device 24 is also configured to generate channel state feedback including at least a representation of the frequency-independent and/or inter-antenna-independent channel state information associated with the phase relaxation.

Figure 13:
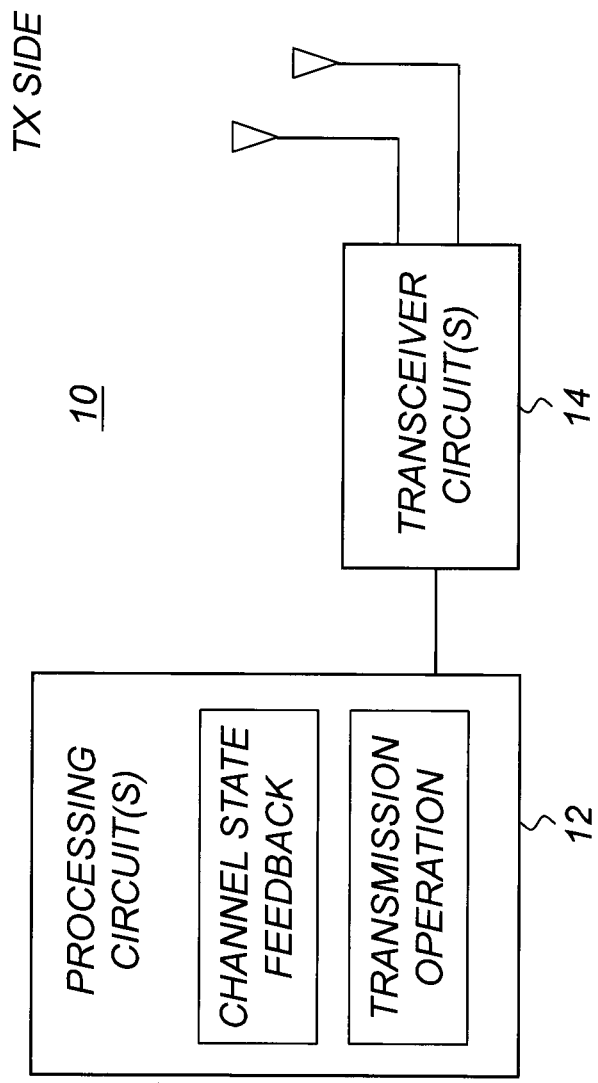
FIG. 13 is a schematic block diagram illustrating an example of a communication unit from the transmitter perspective according to an embodiment.

FIG. 13 is a schematic block diagram illustrating an example of a communication unit from the transmitter perspective according to an embodiment. The communication unit 10 basically comprises processing circuit(s) 12, especially for processing received channel state feedback and controlling transmission operation accordingly, and transceiver circuit(s) 14 for receiving and/or transmitting relevant signals.

By way of example, there is thus provided a channel state feedback extracting device 12 configured to extract channel state feedback related to a wireless link between a transmitter having multiple transmit antennas and a receiver having at least one receive antenna. The channel state feedback extracting device 12 is configured to receive feedback signaling and extract channel state feedback including at least a representation of frequency-independent and/or inter-antenna-independent channel state information associated with phase relaxation of at least a subset of the effective channels between the transmitter and the receiver. Each effective channel including a propagation channel, and signal paths in the transmitter and the receiver.

Figure 14:
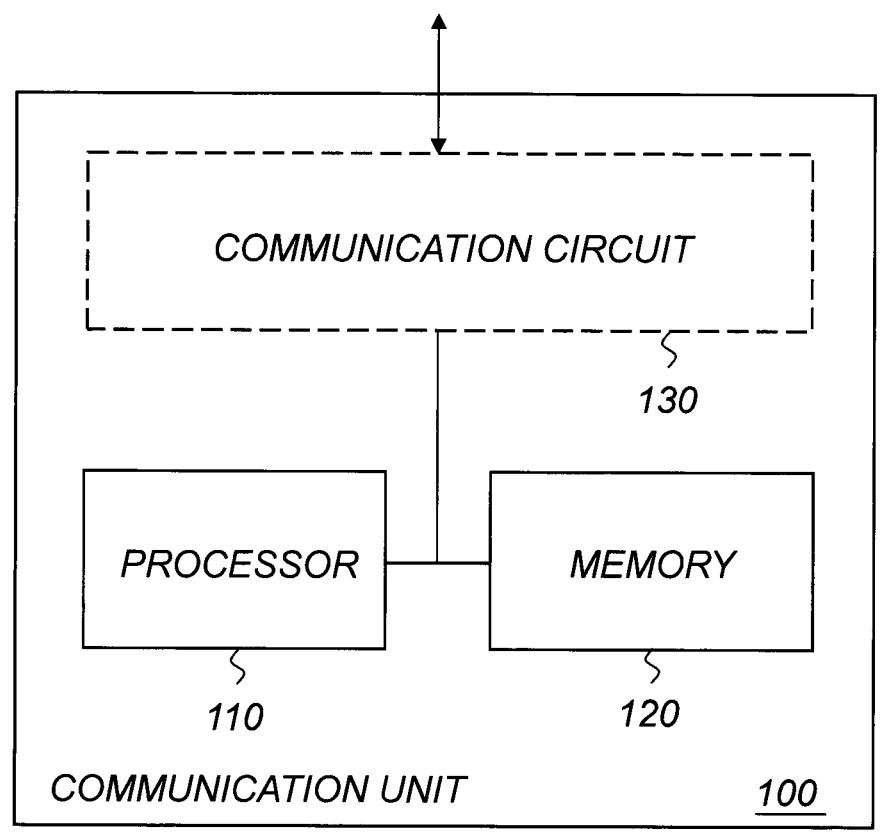
FIG. 14 is a schematic block diagram illustrating an example of a communication unit according to another embodiment.

FIG. 14 is a schematic block diagram illustrating an example of a communication unit according to another embodiment. In this particular example, the communication unit 100 comprises a processor 110 and a memory 120, said memory comprising instructions executable by the processor, whereby the processor is operative to perform operations of the communication unit, e.g. to perform the channel state feedback method and/or the multi-antenna transmission method.

The communication unit 100 may also have communication circuitry 130. The communication circuitry 130 may include functions for wired and/or wireless communication with other devices and/or network nodes in the network. In a particular example, the communication unit such as a wireless device, UE, and/or network node may include radio circuitry for communication with one or more other nodes, including transmitting and/or receiving information. The communication circuitry 130 may be interconnected to the processor 110 and/or memory 120.

Figure 15:
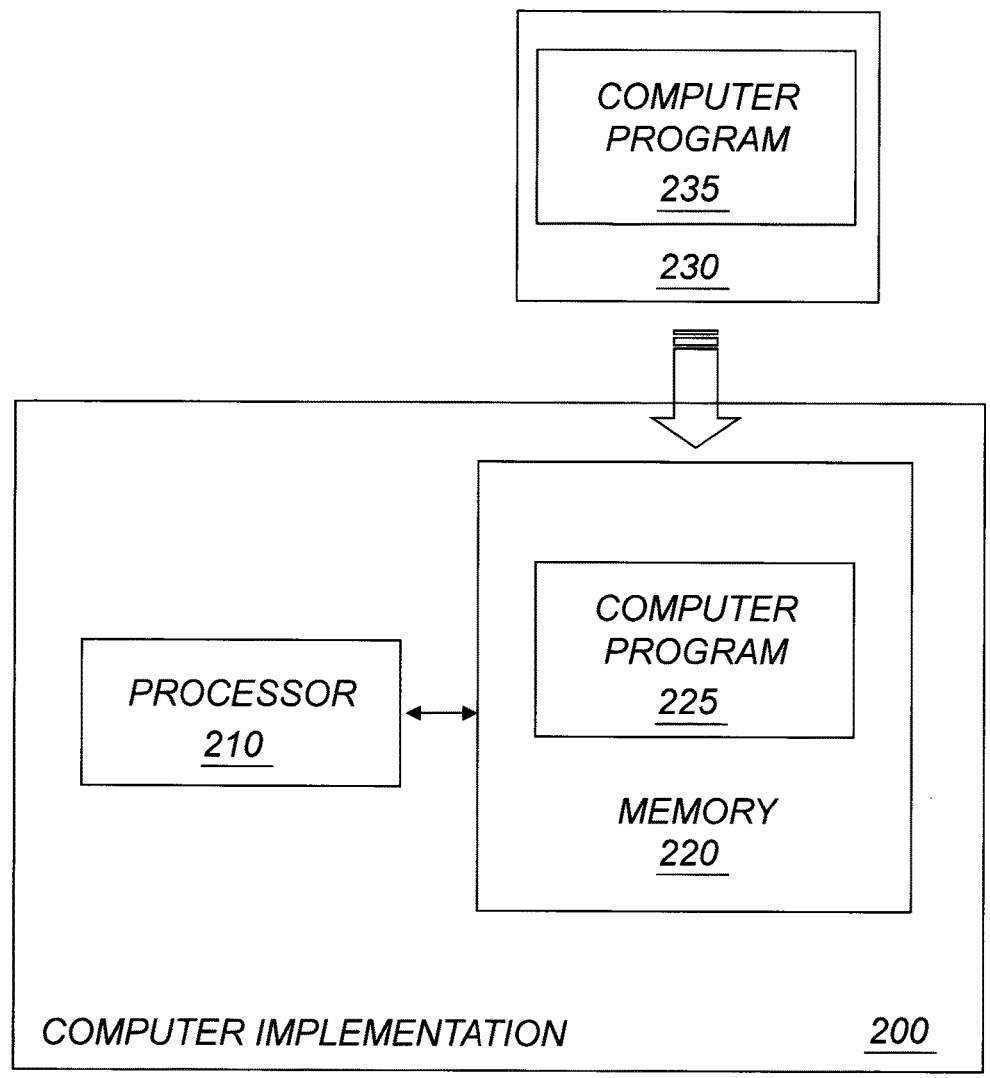
FIG. 15 is a schematic block diagram illustrating an example of a computer-implementation according to an embodiment.

FIG. 15 is a schematic block diagram illustrating an example of a computer-implementation 200 according to an embodiment.

In this particular example, at least some of the steps, functions, procedures, modules and/or blocks described herein are implemented in a computer program 225/235, which is loaded into the memory 220 for execution by processing circuitry including one or more processors 210. The processor(s) 210 and memory 220 are interconnected to each other to enable normal software execution. An optional input/output device may also be interconnected to the processor(s) and/or the memory to enable input and/or output of relevant data such as input parameter(s) and/or resulting output parameter(s).

In general, the term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular aspect, there is provided a computer program for generating, when executed by at least one processor, channel state feedback related to a wireless link between a transmitter having multiple transmit antennas and a receiver having at least one receive antenna. The computer program comprises instructions, which when executed by said at least one processor, cause the at least one processor to:

determine channel estimates for at least a subset of the effective channels between the transmitter and the receiver, each effective channel including a propagation channel, and signal paths in the transmitter and the receiver;

determine frequency-independent and/or inter-antenna-independent channel state information associated with phase relaxation of at least the subset of the effective channels based on the channel estimates; and generate channel state feedback including at least a representation of the frequency-independent and/or inter-antenna-independent channel state information associated with the phase relaxation.

In another particular aspect, there is provided a computer program for controlling, when executed by at least one processor, multi-antenna transmission from a transmitter having multiple transmit antennas to a receiver having at least one receive antenna. The computer program comprises instructions, which when executed by said at least one processor, cause the at least one processor to:

extract channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver; and control the transmission operation at least partly based on the channel state feedback including the representation of frequency-independent and/or inter-antenna-independent channel state information associated with the phase relaxation.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 225/235 may thus be loaded into the operating memory of a computer or equivalent processing device for execution by the processing circuitry thereof.

The flow diagram or diagrams presented or otherwise described herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor. Hence, the apparatus, which may be implemented in a communication unit such as a wireless device or network node, may alternatively be defined as a group of function modules, where the function modules are implemented as a computer program running on at least one processor.

The computer program 225/235 residing in memory 220/230 may thus be organized as appropriate function modules configured to perform, when executed by the processor, at least part of the steps and/or tasks described herein.

Figure 16:
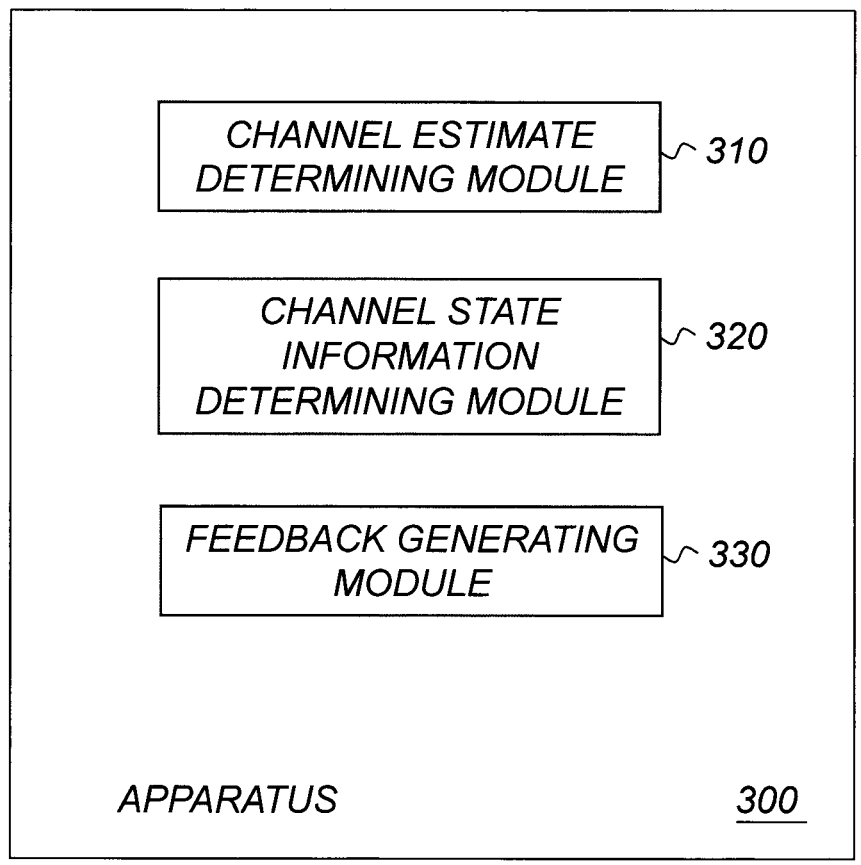
FIG. 16 is a schematic block diagram illustrating an example of an apparatus for providing channel state feedback related to a wireless link according to an embodiment.

FIG. 16 is a schematic block diagram illustrating an example of an apparatus for providing or generating channel state feedback related to a wireless link according to an embodiment. The apparatus 300 comprises a channel estimate determining module 310 for determining channel estimates for at least a subset of the effective channels between the transmitter and the receiver, each effective channel including a propagation channel, and signal paths in the transmitter and the receiver. The apparatus also comprises a channel state information determining module 320 for determining frequency-independent and/or inter-antenna-independent channel state information associated with phase relaxation of at least the subset of the effective channels based on the channel estimates. The apparatus further comprises a feedback generating module 330 for generating channel state feedback including at least a representation of the frequency-independent and/or inter-antenna-independent channel state information associated with the phase relaxation.

A wireless device for wireless communication such as a UE may include the apparatus 300.

Figure 17:
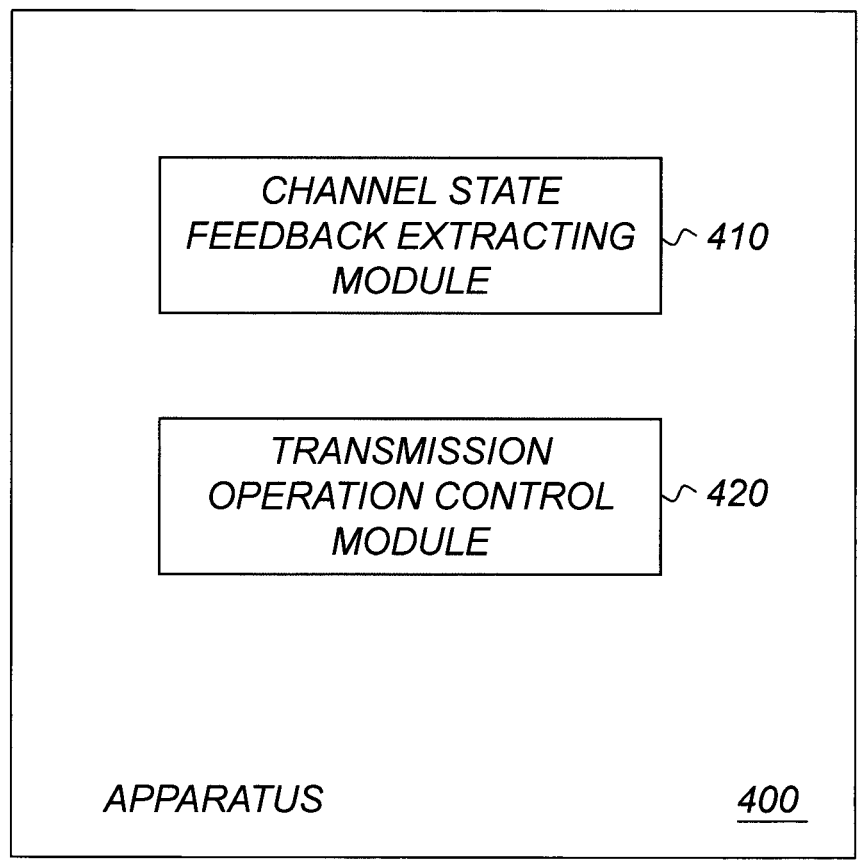
FIG. 17 is a schematic block diagram illustrating an example of an apparatus for controlling multi-antenna transmission from a transmitter according to an embodiment.

FIG. 17 is a schematic block diagram illustrating an example of an apparatus for controlling multi-antenna transmission from a transmitter according to an embodiment. The apparatus 400 comprises a channel state feedback extracting module 410 for extracting channel state feedback including at least a representation of frequency-independent and/or inter-antenna-independent channel state information associated with phase relaxation of at least a subset of the effective channels between the transmitter and the receiver, each effective channel including a propagation channel, and signal paths in the transmitter and the receiver. The apparatus 400 also comprises a transmission operation control module 420 for controlling the transmission operation at least partly based on the channel state feedback including the representation of frequency-independent and/or inter-antenna-independent channel state information associated with the phase relaxation.

A network node for wireless communication such as a base station like an eNB may include the apparatus 400.

Alternatively it is possible to realize the modules in FIG. 16 and/or FIG. 17 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] Love, D. J and Heath, R. W., Jr, "Limited feedback unitary precoding for spatial multiplexing systems", IEEE Transactions on Information Theory, Vol. 51, Issue 8, pp. 2967-2976, August 2005.

[2] WO 2011/123008

The invention claimed is:

1. A method for providing channel state feedback related to a wireless link between a transmitter having multiple transmit antennas and a receiver having at least one receive antenna, wherein the method comprises:
   determining channel estimates for at least a subset of effective channels between the transmitter and the receiver, wherein each effective channel includes a propagation channel and signal paths in the transmitter and the receiver;
   determining frequency-independent and/or inter-antenna-independent channel state information associated with phase relaxation of at least the subset of the effective channels based on the determined channel estimates;
   generating channel state feedback, including at least a representation of the frequency-independent and/or inter-antenna-independent channel state information associated with the phase relaxation and a channel quality indicator, wherein the channel quality indicator indicates a transport format supported by at least the subset of the effective channels, and wherein at least the subset of the effective channels is classified as having a low angle spread when the channel quality indicator is greater than a threshold; and
   transmitting the channel state feedback to the transmitter.

2. The method of claim 1, wherein each effective channel includes the propagation channel and the signal paths in the transmitter and the receiver, from a respective transmit antenna port to a respective receive antenna, and includes at least part of a receiver chain connected to the respective receive antenna.

3. The method of claim 1, wherein the channel state feedback is generated and transmitted as part of a precoder report, including the representation of the frequency-independent and/or inter-antenna-independent channel state information associated with the phase relaxation.

4. The method of claim 1, wherein the determined frequency-independent and/or inter-antenna-independent channel state information is both frequency-independent and inter-antenna-independent.

5. The method of claim 1, wherein the determined frequency-independent and/or inter-antenna-independent channel state information is frequency-independent.

6. The method of claim 1, wherein the determined frequency-independent and/or inter-antenna-independent channel state information is inter-antenna-independent.

7. The method of claim 1, wherein the frequency-independent and/or inter-antenna-independent channel state information associated with the phase relaxation of at least the subset of the effective channels is determined by determining the phase relaxation independently for each of at least a subset of the multiple transmit antennas, and wherein the representation of the inter-antenna-independent channel state information includes a representation of the independently determined phase relaxations.

8. The method of claim 7, wherein the independently determined phase relaxations are represented as absolute or relative phases.

9. The method of claim 7, wherein the independently determined phase relaxation, for each of at least the subset of the multiple transmit antennas, includes at least a static and frequency-independent phase relaxation part.

10. The method of claim 9, wherein a frequency-dependent phase relaxation part is also determined and reported as part of the channel state feedback.

11. The method of claim 7, wherein each independently determined phase relaxation relates to a static phase error associated with a corresponding or respective transmit antenna.

12. The method of claim 11, wherein a metric of position, at which static phase errors were measured, is determined.

13. The method of claim 7, wherein the representation of the independently determined phase relaxations corresponds to a diagonal matrix A having phase relaxation related components in elements of a main diagonal.

14. The method of claim 13, wherein the representation of the independently determined phase relaxations corresponding to the diagonal matrix A is reported with a representation of a precoder $W^{(W)}$ for providing a combined precoder structure $W = \Lambda W^{(W)}$.

15. The method of claim 14, wherein the combined precoder structure comprises at least two parts, wherein one part is selected independently for each transmit antenna, and wherein another part is selected by jointly considering the multiple transmit antennas.

16. The method of claim 13, wherein $$\Lambda = \Lambda_s = \begin{bmatrix} e^{j\alpha_1} & & 0 \\ & \ddots & \\ 0 & & e^{j\alpha_K} \end{bmatrix},$$

wherein $\Lambda_s$ indicates that this matrix is static and not frequency dependent and is parameterized by static phase compensation parameters $\alpha_1, \ldots, \alpha_K$, or $$\Lambda = \Lambda_f \Lambda_s = \begin{bmatrix} e^{jf\tau_1} & & 0 \\ & \ddots & \\ 0 & & e^{jf\tau_K} \end{bmatrix} \begin{bmatrix} e^{j\alpha_1} & & 0 \\ & \ddots & \\ 0 & & e^{j\alpha_K} \end{bmatrix} = \begin{bmatrix} e^{j(f\tau_1+\alpha_1)} & & 0 \\ & \ddots & \\ 0 & & e^{j(f\tau_K+\alpha_K)} \end{bmatrix}$$

wherein this matrix is frequency dependent due to the dependency of the term f, which corresponds to subscriber index and/or frequency and $\Lambda_f$ is parameterized by parameters $\tau_1, \ldots, \tau_K$, or $$\Lambda = \Lambda_a \Lambda_f \Lambda_s = \begin{bmatrix} r_1 & & 0 \\ & \ddots & \\ 0 & & r_K \end{bmatrix} \begin{bmatrix} e^{jf\tau_1} & & 0 \\ & \ddots & \\ 0 & & e^{jf\tau_K} \end{bmatrix} \begin{bmatrix} e^{j\alpha_1} & & 0 \\ & \ddots & \\ 0 & & e^{j\alpha_K} \end{bmatrix} =$$

$$\begin{bmatrix} r_1 e^{j(f\tau_1+\alpha_1)} & & 0 \\ & \ddots & \\ 0 & & r_K e^{j(f\tau_K+\alpha_K)} \end{bmatrix}$$

wherein this matrix is taking into account inter-antenna-independent amplitude differences, and wherein $r_K$ is an amplitude of transmit antenna port k.

17. The method of claim 16, wherein values of the static phase compensation parameters $\alpha_K$ are constrained to a finite set.

18. The method of claim 13, wherein the channel state feedback is provided only for a subset of the elements in the diagonal matrix Λ.

19. A method of performing multi-antenna transmission from a transmitter having multiple transmit antennas to a receiver having at least one receive antenna, wherein the method comprises:
receiving channel state feedback, including at least: a representation of frequency-independent and/or inter-antenna-independent channel state information associated with phase relaxation and a channel quality indicator of at least a subset of effective channels between the transmitter and the receiver, wherein each effective channel includes a propagation channel and signal paths in the transmitter and the receiver, wherein the channel quality indicator indicates a transport format supported by at least the subset of the effective channels, and wherein at least the subset of the effective channels is classified as having a low angle spread when the channel quality indicator is greater than a threshold;
determining a transmission operation at least partly based on the channel state feedback, including the representation of frequency-independent and/or inter-antenna-independent channel state information associated with the phase relaxation and the channel quality indicator; and
performing the multi-antenna transmission according to the determined transmission operation.

20. The method of claim 19, wherein each effective channel includes the propagation channel and the signal paths in the transmitter and the receiver, from a respective transmit antenna port to a respective receive antenna, and includes at least part of a receiver chain connected to the respective receive antenna.

21. The method of claim 19, wherein the channel state feedback is received as part of a precoder report including the representation of frequency-independent and/or inter-antenna-independent channel state information associated with the phase relaxation.

22. The method of claim 19, wherein the frequency-independent and/or inter-antenna-independent channel state information is both frequency-independent and inter-antenna-independent.

23. The method of claim 19, wherein the frequency-independent and/or inter-antenna-independent channel state information is frequency-independent.

24. The method of claim 19, wherein the frequency-independent and/or inter-antenna-independent channel state information is inter-antenna-independent.

25. The method of claim 19, wherein a precoder is determined at least partly based on the channel state feedback including the representation of frequency-independent and/or inter-antenna-independent channel state information associated with the phase relaxation and the channel quality indicator, and wherein the multi-antenna transmission is performed according to the determined precoder.

26. The method of claim 25, wherein a diagonal matrix Λ, having phase relaxation related components in elements of a main diagonal, is generated based on the representation of frequency-independent and/or inter-antenna-independent channel state information associated with the phase relaxation, and wherein the precoder is determined by combining the diagonal matrix Λ with a precoding matrix.

27. The method of claim 19, wherein the representation of the frequency-independent and/or inter-antenna-independent channel state information includes a representation of independent phase relaxations for at least a subset of the multiple transmit antennas, and a representation of an independent phase relaxation for each of at least the subset of the multiple transmit antennas.

28. The method of claim 27, wherein the independent phase relaxations are represented as absolute or relative phases.

29. The method of claim 27, wherein the independent phase relaxation, for each of at least the subset of the multiple transmit antennas, includes at least a static and frequency-independent phase relaxation part.

30. The method of claim 27, wherein each independent phase relaxation relates to a static phase error associated with a corresponding or respective transmit antenna.

31. The method of claim 30, wherein the transmitter, with knowledge of the static phase error $\hat{\omega}_k$, performs phase error compensation in baseband processing by applying an opposite phase shift $-\hat{\omega}_k$ of signals transmitted from transmit antenna k.

32. The method of claim 27, wherein a precoder is generated by augmenting a precoding matrix based on the independent phase relaxations, and wherein the multi-antenna transmission is performed according to the generated precoder.

33. The method of claim 32, wherein the precoder matrix, denoted $W^{(H)}$, is augmented by a diagonal matrix, denoted Λ, including the independent phase relaxations in elements of a main diagonal for providing a combined precoder structure $W=\Lambda W^{(H)}$.

34. The method of claim 33, wherein the combined precoder structure $W=\Lambda W^{(H)}$ allows for compensation of static phase error terms and/or frequency dependent terms that occur due to time misalignments.

35. The method of claim 19, wherein a representation of a frequency-dependent phase relaxation part is also received as part of the channel state feedback and used as input for determining the transmission operation.

36. The method of claim 19, wherein the channel state feedback including at least the representation of frequency-independent and/or inter-antenna-independent channel state information is collected from multiple receivers and jointly processed to obtain an estimate of the phase relaxation.

37. The method of claim 36, wherein the channel state feedback from wireless communication devices located at widely distributed positions throughout a cell are used for estimating static phase errors.

38. A communication unit, comprising:
transceiver circuitry configured for receiving multi-antenna transmissions from a transmitter via at least one receive antenna; and
processing circuitry operatively associated with the transceiver circuitry and configured to:
 determine channel estimates for at least a subset of effective channels between the transmitter and the communication unit, wherein each effective channel includes a propagation channel and signal paths in the transmitter and a receiver portion of the communication unit;
 determine frequency-independent and/or inter-antenna-independent channel state information associated with phase relaxation of at least the subset of the effective channels based on the determined channel estimates;
 generate channel state feedback, including at least a representation of the frequency-independent and/or inter-antenna-independent channel state information associated with the phase relaxation and a channel quality indicator, wherein the channel quality indicator indicates a transport format supported by at least the subset of the effective channels, and wherein at least the subset of the effective channels is classified as having a low angle spread when the channel quality indicator is greater than a threshold; and
 transmit the channel state feedback to the transmitter.

39. A communication unit, comprising:
transceiver circuitry configured for multi-antenna transmission from multiple transmit antennas to a receiver having at least one receive antenna; and
processing circuitry operatively associated with the transceiver circuitry and configured to:
 receive channel state feedback, including at least a representation of frequency-independent and/or inter-antenna-independent channel state information associated with phase relaxation and a channel quality indicator of at least a subset of effective channels between the communication unit and the receiver, wherein each effective channel includes a propagation channel and signal paths in a transmitter portion of the communication unit and the receiver, wherein the channel quality indicator indicates a transport format supported by at least the subset of the effective channels, and wherein at least the subset of the effective channels is classified as having a low angle spread when the channel quality indicator is greater than a threshold;
 determine a transmission operation at least partly based on the channel state feedback including the representation of frequency-independent and/or inter-antenna-independent channel state information associated with the phase relaxation and the channel quality indicator; and
 perform the multi-antenna transmission according to the determined transmission operation.

* * * * *